(12) United States Patent  
Yucel

(10) Patent No.: US 7,140,000 B2  
(45) Date of Patent: Nov. 21, 2006

(54) KNOWLEDGE ORIENTED PROGRAMMING

(75) Inventor: Sermet Yucel, Edina, MN (US)

(73) Assignee: Certusoft, Minneapolis, MN (US)

( * ) Notice: Subject to any disclaimer, the term of this patent is extended or adjusted under 35 U.S.C. 154(b) by 721 days.

(21) Appl. No.: 10/034,601

(22) Filed: Dec. 26, 2001

(65) Prior Publication Data

US 2003/0069871 A1    Apr. 10, 2003

Related U.S. Application Data

(60) Provisional application No. 60/328,069, filed on Oct. 9, 2001.

(51) Int. Cl.  
*G06F 9/44* (2006.01)

(52) U.S. Cl. .................. 717/104; 717/136; 706/46

(58) Field of Classification Search ............... 717/104, 717/106; 706/39–61  
See application file for complete search history.

(56) References Cited

U.S. PATENT DOCUMENTS

| | | | |
|---|---|---|---|
| 4,658,370 A * | 4/1987 | Erman et al. ................ 706/60 |
| 5,539,862 A * | 7/1996 | Short et al. .................. 706/45 |
| 5,842,193 A * | 11/1998 | Reilly ........................... 706/45 |
| 6,374,252 B1 * | 4/2002 | Althoff et al. .............. 707/102 |
| 6,415,275 B1 * | 7/2002 | Zahn ............................ 706/47 |
| 6,701,381 B1 * | 3/2004 | Hearne et al. .............. 719/313 |
| 2002/0073236 A1 * | 6/2002 | Helgeson et al. ........... 709/246 |
| 2003/0023413 A1 * | 1/2003 | Srinivasa ....................... 703/2 |

OTHER PUBLICATIONS

Y. Moses and O. Kislev, "Knowledge-oriented Programming", 12th ACM Symposium on Principles on Distributed Computing, 1993.*

* cited by examiner

*Primary Examiner*—Kakali Chaki  
*Assistant Examiner*—Trenton J. Roche  
(74) *Attorney, Agent, or Firm*—Dena VanDeVoort Ehrich

(57) ABSTRACT

A method, apparatus, and program product for designing, implementing, distributing, and deploying computer programs that consist of packaged knowledge components written in modern object oriented programming languages. A meta model defines a model for representing facts, intelligence, and packaging facts and intelligence into readily usable knowledge components implemented in off the shelf object oriented programming languages and tools. In addition, the meta model defines knowledge algebra to assemble and cascade knowledge components into larger and more powerful knowledge components and knowledge oriented software applications. A kernel is provided that links and executes knowledge components and knowledge oriented applications. The kernel dynamically links logical definition of knowledge components and the knowledge application to real implementations.

38 Claims, 28 Drawing Sheets

KNOWLEDGE ORIENTED PROGRAMMING

CROSS-REFERENCE TO RELATED APPLICATIONS

This application claims priority to provisional application No. 60/328,069, filed Oct. 9, 2001, which is incorporated herein by reference.

FIELD OF THE INVENTION

The invention relates to computers and more particularly to knowledge oriented programming on a computer.

BACKGROUND OF THE INVENTION

Object Oriented Programming Languages (OOPL) and Relational Database Management Systems (RDMS) are the two major technological components of most of the contemporary computer programs. An OOPL encodes the domain knowledge (the logic layer) and visualization (the presentation layer) of the application. A database persistently stores application data and provides a declarative query language to selectively retrieve application data when needed.

The existence of two distinct technologies (OOPL and RDMS) leads to an impedance mismatch that must be resolved in the interface layer between the logic layer and the database. Layered architectures try to minimize and contain the impact of two distinct technologies on the design, development, and maintenance of applications.

Multiple approaches were proposed to merge the two different paradigms of computing: object oriented and relational database technologies. Primary motivations were: the elimination of the impedance mismatch between the persistence and logic layers, persistent storage and query of complex objects, and a single computing framework These attempts led to competing proposals and standards. The object oriented community responded with extensions to object oriented technologies while the relational database community proposed extensions to relational databases. Two major proposals are, therefore, object databases and object relational databases Object databases extend the object oriented paradigm to incorporate the concept of relation. In contrast, object relational databases extend the relational data model by providing support for complex data types. In either case, the goal is to provide a single platform that provides persistence and ad hoc query of complex objects.

The logic layer typically consists of rules. It has been anticipated for decades that rules stored and managed in a rule engine or knowledgebase would revolutionize the software industry. Given the fact that relational data model is firmly founded on logic, one might expect that the (object) relational databases should include rules. Although some proposals require the rules as essential, there is not a consensus on whether they are an essential or required as part of next generation systems.

Expert systems explicitly support rules and a significant number of object oriented concepts. Although expert systems are well known, they are not widely adopted by the mainstream software designers and developers. Common characteristics of expert systems (shells) are: a declarative rule language, a declarative language support for object oriented concepts, a pattern matching algorithm (typically a variant of the RETE algorithm), and host language support, for example Java or C++.

Rule engines have several major drawbacks. First, rule engines contain concepts and syntax that are alien to object oriented programming languages and relational databases. Second, rule engines include a fixed pattern-matching algorithm, which may not perform or scale to complex problems. Third, rule engines need to be integrated into object oriented programming languages and relational databases. Fourth, rule engines lack standards for defining, packaging, sharing, and integrating knowledge from different sources. Finally, rule engines are not extensible or adaptable to the particular needs of an application, i.e., they are a fixed generic solution.

Despite the strong need for isolating the logic layer and contrary to the long anticipation, widespread adaptation of rule engines to object oriented software applications did not materialize.

Intelligent databases, i.e., active and deductive databases, are proposals to extend databases to include the rule and event support. Most commercial databases do not yet include explicit rule support that is capable of representing and executing rules in the database. These proposals do not address the impedance mismatch, which is likely to become even more severe if logic layer is moved to persistence layer. The closest database feature, databases triggers, does not meet the needs of business rules.

What is needed to solve these problems is a single computing environment that seamlessly integrates object oriented programming, rules, and relations of complex objects.

SUMMARY

The invention may provide a method, apparatus, and program product for designing, implementing, distributing, and deploying computer programs that consist of packaged knowledge components written in object oriented programming languages. A meta model defines a model for representing facts, intelligence, and packaging facts and intelligence into readily usable knowledge components implemented in off the shelf object oriented programming languages and tools. In addition, the meta model defines knowledge algebra to assemble and cascade knowledge components into larger and more powerful knowledge components and knowledge oriented software applications. The invention provides a kernel that links and executes knowledge components and knowledge oriented applications. The kernel dynamically links logical definition of knowledge components and the knowledge application to real implementations.

DETAILED DESCRIPTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
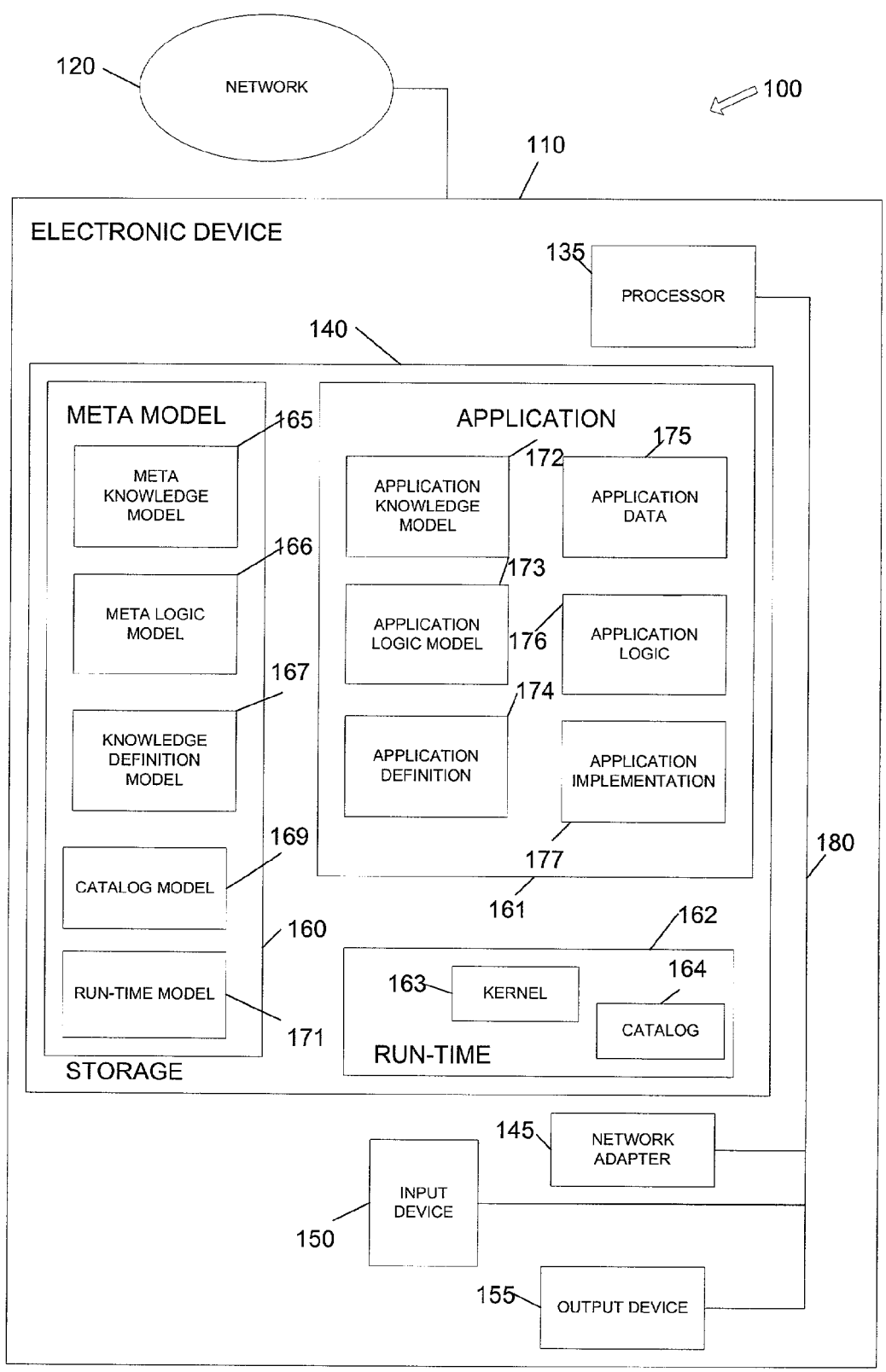
FIG. 1 depicts a block diagram of a computer system, according to an embodiment of the invention.

FIG. 1 depicts a block diagram of a system for implementing an embodiment of the invention. The system 100 may include an electronic device 110 and a network 120.

Electronic device 110 may include a processor 135, a storage device 140, a network adapter 145, an input device 150, and an output device 155, all communicatively coupled via bus 180. Processor 135 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 135 executes instructions and includes that portion of the electronic device 110 that controls the operation of the entire electronic device. Although not depicted in FIG. 1, the processor 135 typically includes a control unit that organizes data and program storage in memory and transfers data and other information between the various parts of the electronic device 110. The processor 135 may receive input data from the input device 150 and the network adapter 145, read and store code and data in the storage device 140, and may present output data via the output device 155. The processor 135 also may transmit and receive packets of information across the network 120 using the network adapter 145.

The network 120 may be any suitable network capable of supporting communication to the electronic device 110. Although one network 120 is shown, in other embodiments any number of networks and/or combinations of networks may be present. In an embodiment, the network 120 may support wireless communications. In another embodiment, the network 120 may support hard-wired communications, such as a telephone line or cable. In an embodiment network, the network 120 may be the Internet and support IP (Internet Protocol). In other embodiments, the network 120 may be a local area network (LAN) or a wide area network (WAN). In still other embodiments, the network 120 may support any appropriate protocol or protocols.

Although the electronic device 110 is shown to contain only a single processor and a single bus, the present invention applies equally to electronic devices that may have multiple processors and to electronic devices that may have multiple buses with some or all performing different functions in different ways.

The storage device 140 represents one or more mechanisms for storing data. For example, the storage device 140 may include read only memory (ROM), random access memory (RAM), magnetic disk storage media, optical storage media, flash memory devices, and/or other machine-readable media. Although only one storage device 140 is shown, multiple storage devices and multiple types of storage devices may be present. Further, although the electronic device 110 is drawn to contain the storage device 140, it may be distributed across other electronic devices.

The storage device 140 may include a Meta Model 160, an Application 161, and a Run-time 162. The Run-time 162 may include instructions capable of being executed on the processor 135 to carry out the functions of the present invention. In another embodiment, some or all of the functions of the present invention may be carried out via hardware in lieu of a processor-based system. Of course, the storage device 140 may also contain additional software and data (not shown), which is not necessary to understanding the invention. The Run-time 162 runs applications, such as application 161. The Run-time 162, Meta Model 160, and Application 162 may be embedded into another program: an application server, a web server, or a standalone application. The Run-time 162 is also the interface to other applications. The Run-time 162 dynamically binds the Application Definition 174 to the Application Implementation 177.

The Meta Model 160 may include a Meta Knowledge Model 165, a Meta Logic Model 166, a Knowledge Definition Model 167, a Catalog Model 169, and a Run-time Model 171.

The Application 161 may include an Application Knowledge Model 172, an Application Logic Model 173, an Application Definition 174, Application Data 175, Application Logic 176, and an Application Implementation 177. The Application Knowledge model 172 complies with the Meta Knowledge Model 165. The Application Logic Model 173 complies with the Meta Logic Model 166. The Application Definition 174 complies with the Knowledge Definition Model 167. The Application Definition 174 is stored in the Catalog Model 169. The Application Data 175 is stored in Knowledge Model 172. Application Logic 176 is stored in Application Logic Model 173.

The Meta Model 160 is a formally-defined programming model and may provide knowledge oriented software design and construction; packaging of knowledge into knowledge components; generalized queries as knowledge components; assembling knowledge components into knowledge oriented applications; independence from a programming language and development tool; rules, events, constraints, relations, classes, and objects within a single programming environment; a computing model based on most common object oriented programming and database concepts; independence from any persistence mechanism; declarative application design and binding; object oriented representation of knowledge; packaged, ready to use, sharable knowledge components; a run-time that can integrate knowledge components into knowledge applications; a software design and development model that emphasizes the componentization of knowledge; and persistence formats compatible with widely accepted formats, such as relational databases and XML.

Informally, knowledge consists of what we know, how we infer, and how we react to external events. The Meta Model 160 is a formal method for modeling knowledge (Meta Knowledge Model 165), modeling inferencing (Meta Logic Model 166), dynamically binding a declaratively defined application to a computer executable process using the Knowledge Definition Model 167, modeling declarative applications and their bindings (Catalog Model 169), and providing a run-time environment via the Run-time Model 171.

Application 161 consists of an Application Knowledge Model 172, Application Logic Model 173, Application Definition 174, Application Data 175, Application Logic 176, and Application Implementation 177. Application Knowledge Model 172 complies with the Meta Knowledge Model 165. Application Data 174 is stored in data structures defined by the Application Knowledge Model 172. Meta Knowledge Model 165, Application Knowledge Model 172, and Application Data 175 are analogous to Relational Model, Database Schema, and Data of Relational Databases. Application Logic Model 173 stores the Application Logic 176. Application Logic Model 173 complies with the Meta Logic Model 166.

Run-time 162 may include a Kernel 163 and a Catalog 164. Catalog 164 is stored in data structures defined by the Catalog Model 169. The Kernel 163 manages the Meta Model 160, Application 161, and the Catalog 164. The Kernel 163 also provides the interface to the external clients and/or applications.

Meta Knowledge Model 165

Figure 7:
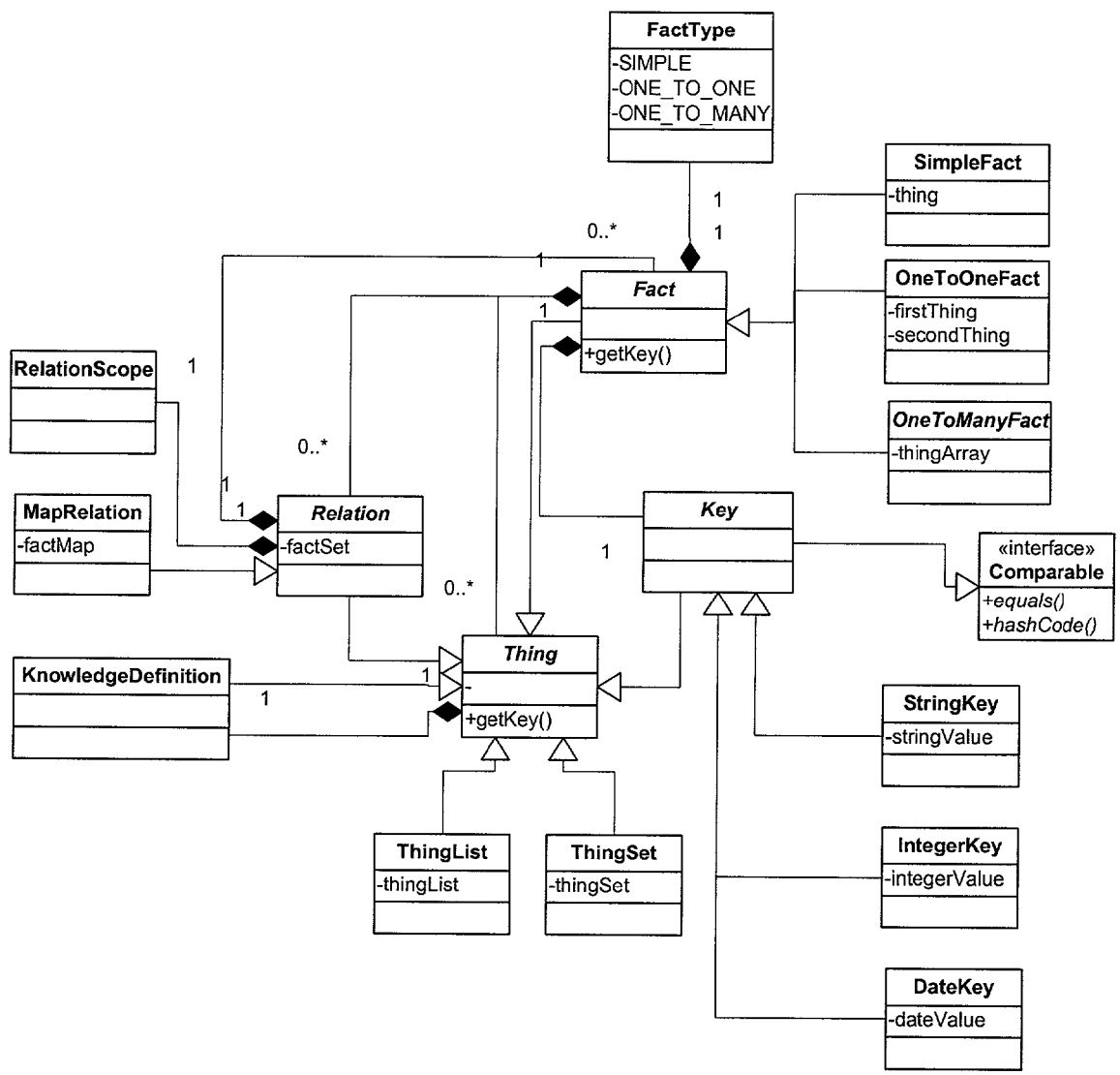
FIG. 7 depicts a UML representation of a Meta Knowledge Model, according to an embodiment of the invention.

FIG. 7 shows the Meta Knowledge Model 165 described using the Unified Modeling Language (UML) notation. The Meta Knowledge Model 165 has the building blocks of an application's knowledge model. Thing, Key, Fact, and Relation are the fundamental building blocks. They are analogous to the Attribute, Key, Tuple, and Relation of Relational Data Model. The Meta Model 160 defines building blocks as abstract types. The abstract types specify the Meta Knowledge Model unambiguously and independently of any host programming language.

The Thing is the base class of all objects in the data model, in other words, all the domain objects. An instance of a Thing is a named object that is the subject of the knowledge. All application objects have a type that is a sub type of the Thing.

The Key class is the base class of a unique identifier of an application object. A key is required to be unique within the scope of the object it refers to. When an object is created, it is stored by value in only one relation. All other relations refer to the same object by its key. The Meta Model 160 does not allow facts to refer to objects by pointers or object references. The Meta Model 160 requires that all sub types of Key implement usual comparison operators: Equality, Greater Than, and Less Than.

A fact is a statement that is assumed to be true. A fact consists of a predicate and the list of arguments for which the predicate is true. For example, in the statement "John is a biologist," "biologist" is the predicate and "John" is the thing for which the predicate is true.

In the Meta Model 160, the Fact class is a generic structure type to organize and hold subjects of predicates. Formally, the Fact is a set of things.

A relation is the container for a set of facts and the predicate of the facts it contains. The name of the relation is the name of the predicate. The predicate restricts the types of facts that can be inserted into the relation. Facts can be inserted into, updated in, deleted from, or queried in a relation. All facts of a relation must be of the same type or they must have a common base type. All facts of a relation may have the same cardinality, i.e., facts contain same number of things. A Fact implementation may have a fixed cardinality, that is, the number of elements in the Thing set is fixed.

StringKey, DateKey, and IntegerKey are three common types of keys. Additional key types can be added if necessary. ThingList and ThingSet are commonly needed sub types of Thing. They often used to encode a fact between one object and a set or list of other objects. SimpleFact is the implementation of a fact type that has a cardinality of one. OneToOneFact is the implementation of a fact type that has a cardinality of two. In practice, higher cardinality facts are rarely needed. If required they can be created by extending the Fact class or OneToManyFact. MapRelation is a generic implementation of Relation. As the name suggest, MapRelation uses a hash map to store and index its facts.

The Meta Knowledge Model 165 has the expressive power to represent and index any type of data structure and relationship types encountered in relational database design and object oriented programming.

Meta Logic Model 166

Figure 8:
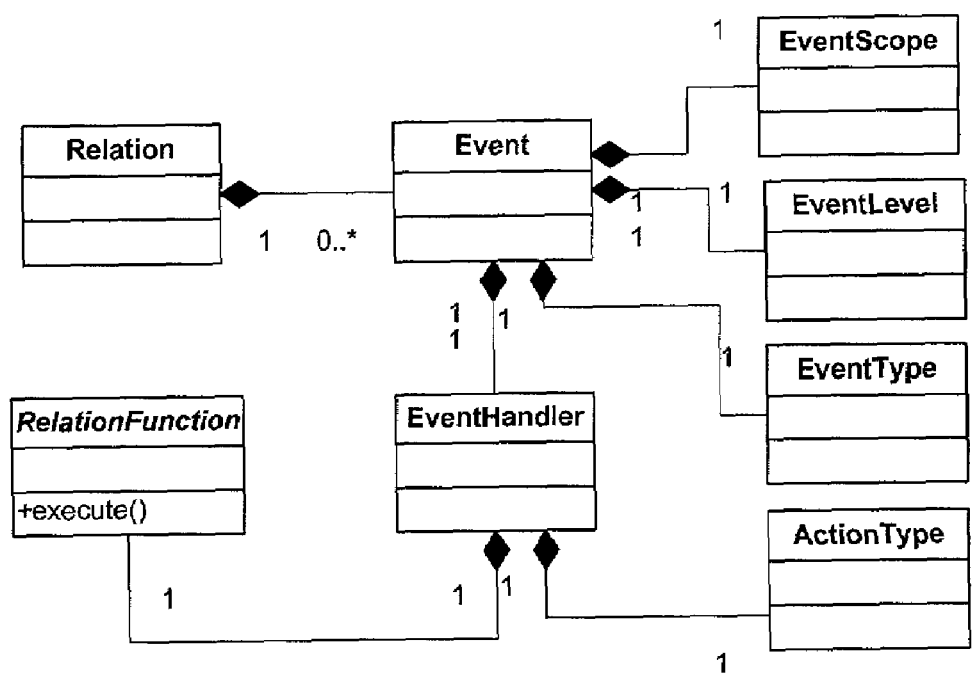
FIG. 8 depicts a UML representation of a Meta Logic Model, according to an embodiment of the invention.

The Meta Knowledge Model 165 is a protocol for organization, indexing, and retrieval of objects. The Meta Logic Model 166 is a protocal for deriving new relations from a set of base relations, and imposing rules and constraints on the relations. It specifies the building blocks of an application's logic: Event, Event Handler, and RelationFunction. FIG. 8 shows the Meta Logic Model described using the Unified Modeling Language (UML) notation.

The Meta Knowledge Model 160 requires that all knowledge is stored in relations. Similarly, Meta Logic Model 165 requires that all computed or inferred knowledge be returned as a relation. Relation Functions are special in that they take relations as input and return a relation. The Relation Function is a generalization of both a database query and function concept in programming languages.

RelationFunction is an abstract class. The application provides the implementation. Typically a relation function is a thin wrapper to an existing algorithm. The simplicity and the generality of the RelationFunction enable the end users and the application designers to reuse or integrate existing code. RelationFunctions forms a closed algebra. Closure property ensures that RelationFunctions can be cascaded to implement complex logic.

An Event is a change in a relation. The Run-time 162 monitors the changes to the relations to ensure that change is allowed and to take necessary actions. An event is associated with a relation. Typical changes are insertion, deletion, and update of facts. An event may apply to any fact or to a number of specific facts. Once an event is detected, an action may need to be taken. An event has an event handler that represents the action. An event and event handler pair represents a rule or a constraint: If <event> then <eventHandler>. The designer of Application 161 may specify the events. Typically, there is no need to override the Event and EventHandler classes. An event has one of the following scopes: Application, and Session. Application and Session will be discussed later in detail. When an event is application scope, it applies to all sessions of the application. When it is session scope, it applies to specific session in which it is declared. An event has one of the following types: Insert, Delete, Update, Add, and Drop. These are the allowed operations on relations. Since all knowledge is stored in relations, every event is one of these types. There are two levels of an event: Relation, and Fact. When an event has the Relation Level, it applies to any fact in the relation. When it is Fact Level, it only applies to specified facts.

An event handler is a specification of what action will be taken and where. An event handler has a relation function (what to execute) and a target relation (where to put the result).

When an event handler is invoked, its relation function is executed. The action of an event handler is an operation between two relations: the output of the relation function and the target relation. An event handler has the following action types: Clear, Drop, Replace, Insert, Delete, and Update. An action type determines the operation on the target relation.

The Relation Function, Event, and Event Handlers together provide the functionality of query, computation, rule, and constraint. The Meta Logic Model 166 is a model of the logical flow of a software application 161. Separation of the application logic is critical to on-demand assembly of applications from a set of data structures and algorithms.

Knowledge Definition Model 167

Figure 9:
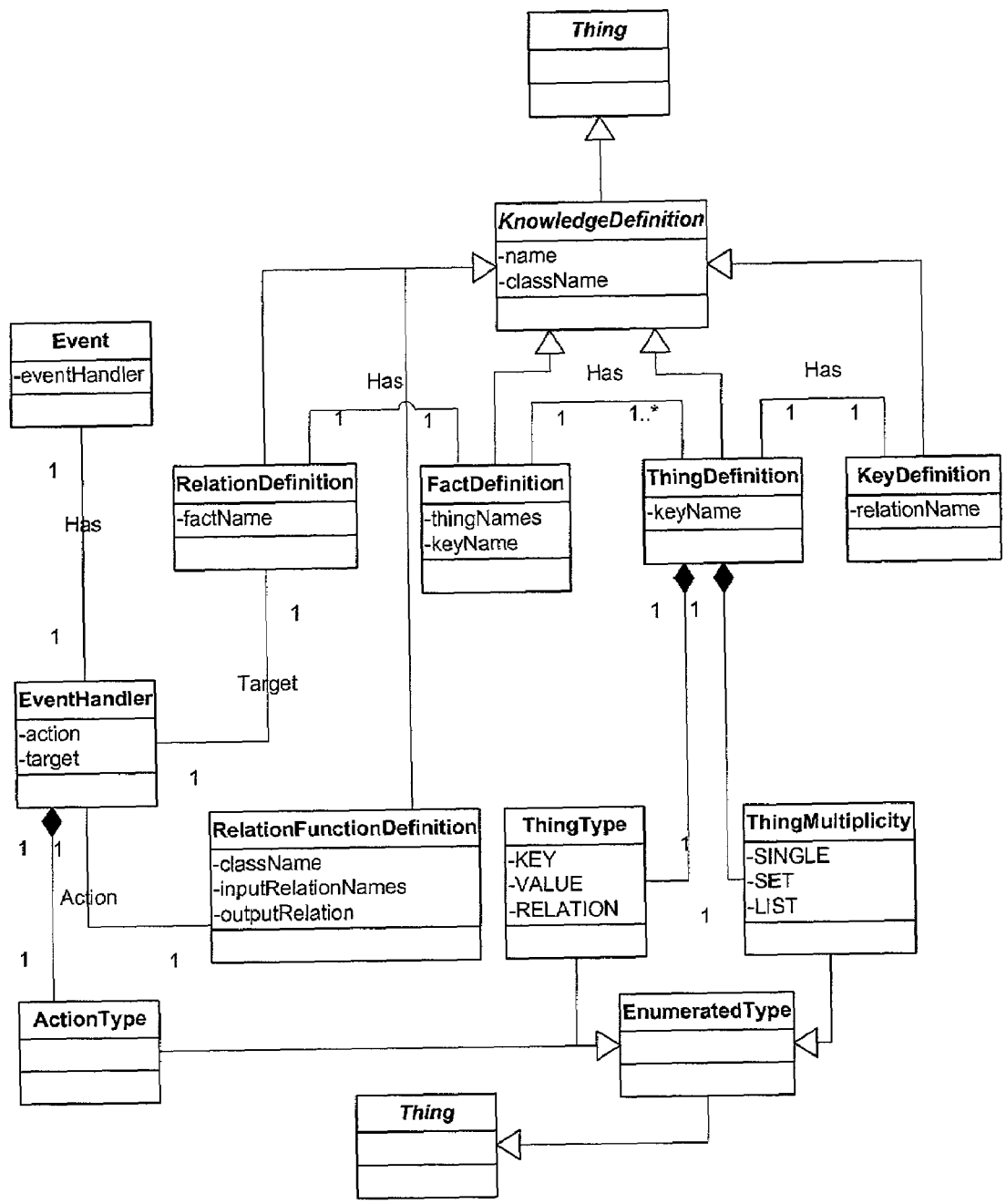
FIG. 9 depicts a UML representation of a Knowledge Definition Model, according to an embodiment of the invention.

The Meta Model 160 may separate the logical structure of a software application from its implementations. The Knowledge Definition Model 167 is an object-oriented model to capture and store the logical design of an application. FIG. 9 shows the Knowledge Definition Model 167 described using the Unified Modeling Language (UML) notation. The Kernel 163 binds the logical design to a real implementation at run time. In the Meta Model 160, users design the application at a logical level and then assemble a set of implementing components at run time. Logical application definition and dynamic binding is key to realizing knowledge component technologies and markets. A precise mapping of the logical design to physical implementation is also critical to the development of visual design tools and automatic code generation. The conversion from logical to physical model is lossless. The separation of logical and physical design enables the domain experts do design the application without worrying about the implementation.

Most of the building blocks of the Application 161 has a matching component in the Knowledge Definition Model 167. The logical definition of an application is also used to enforce type safety.

Catalog Model 169 and Catalog 164

The Catalog 164 stores the applications, their logical design, and their user sessions and run-time data. The Catalog Model 169 specifies the structure and building blocks of Catalog 164.

SYS_Catalog is the root relation of Run-time 162. Storage Device 140 may have multiple instances of Run-time 162 running. Each instance has its own catalog. An instance of SYS_Catalog is created by the Run-time 162 automatically. SYS_App is the root relation of an application. SYS_App and the relations contained in it form the application catalog. End users with sufficient privileges can query and modify the application catalog directly. Knowledge definitions stored the Catalog 164 are used to instantiate objects, enforce type constraints, and referential integrity by the Runtime 162.

Kernel 163 creates an instance of an application catalog when it loads the application. The application catalog is destroyed when an application is unloaded.

SYS_AppSessionKnowledge is the root relation of session specific application knowledge. SYS_AppSessionKnowledge and the relations contained in it form the session catalog. Kernel 163 creates an instance of a session catalog when the session is created. The session catalog is destroyed when user closes the session or when the session expires.

The Kernel 163 manages the application catalog and the session catalog. The Catalog 164 may have multiple applications loaded. Each application may have multiple sessions. Knowledge can be shared between the applications and sessions.

Runtime 162

Figure 10:
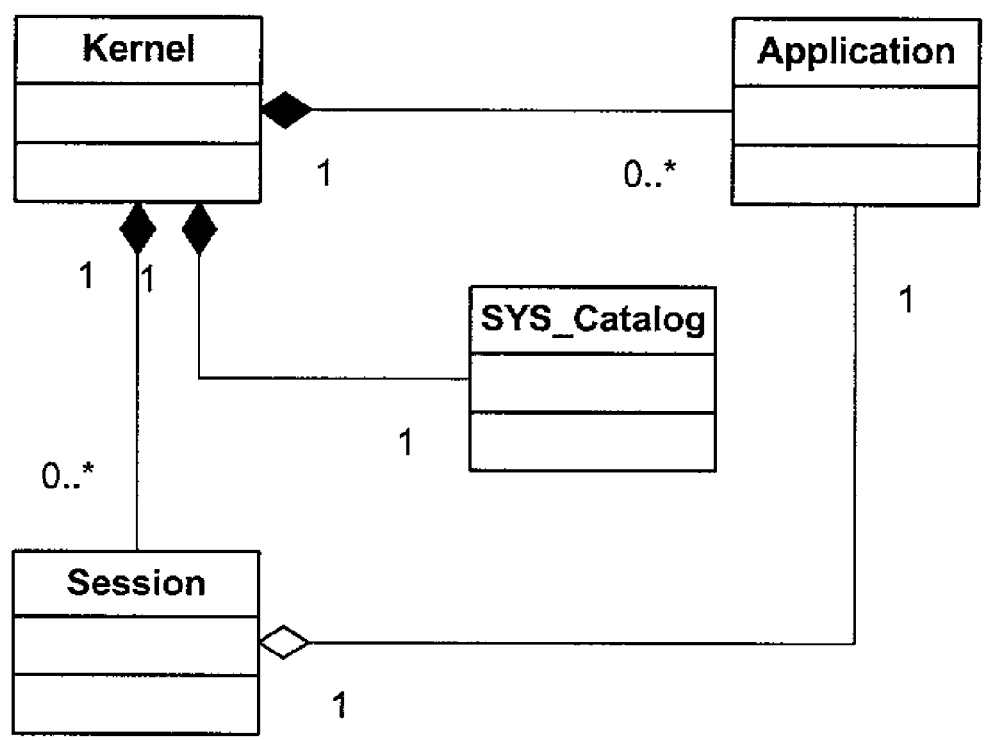
FIG. 10 depicts a UML representation of a Run-time Model, according to an embodiment of the invention.

The Runtime 162 consists of Kernel 163, and the Catalog 164. FIG. 10 shows the Run-time described using the Unified Modeling Language (UML) notation. The Run-time 162 is the container for the applications, and the components that manages the applications. Responsibilities of the Kernel 163 include system initialization, loading and binding of the applications, providing client access to application relations and relation functions, linking the application to a real implementation, monitoring relations for events, executing the event handlers when events are detected, and managing multiple user sessions. The clients of System 100 may create an instance of the Kernel 163 as the first step. All system functionality is then accessible from the kernel object. A kernel object can be embedded to any container application, for example, web server, application server, or a desktop application. The Kernel 163 is independent of the application and the host environment. The Kernel 163 can accommodate multiple clients (users) for multiple applications. The Kernel 163 allocates a separate copy of the application for each concurrent client.

The Kernel's role is equivalent to the role of an operating system. The Kernel 163, like an operating system, runs the applications without knowing their context. It needs to know only a small number of things. The Kernel 163 manages an application using the information contained in the Meta Model 160. The operational job of the Kernel 163 is to respond to client requests, detect system events, call the event handlers, and take specified actions on the relations. Details of the application are not need to be known to the Kernel 163.

A session is where a client's work is stored. A session is created when a client sends the first request to the Kernel 163. It is destroyed when it is expired, or when the client explicitly terminates the session. The Kernel 163 can have multiple applications loaded and running. When a client requests an application to be loaded, the Kernel 163 reads the Application Definition 174 from a text file. The Application Definition 174 includes the logical definition of the application and its run-time bindings.

Application 161

Application 161 consist of the Application Knowledge Model 172, Application Logic Model 173, Application Data 175, Application Logic 176, Application Definition 174, and Application Implementation 177.

Application Knowledge Model 172 is the set of application domain classes that specify how the known facts are organized and indexed. There can be any number of classes. Each class must be a sub class of a class contained within the Meta Knowledge Model 165. Application Data 175 are the set objects that are instances of the classes defined within the Application Knowledge Model 172.

Application Logic Model 173 is the set of application domain Relation Functions. Each domain Relation Function must be a sub type of the base Relation Function specified by the Meta Logic Model 166. Application Logic 176 is the set objects that are instances of classes defined within the Application Logic Model 173 and the set of objects that are instances of Event and Event Handler classes defined by the Meta Logic Model 166.

Application Definition 174 is a textual or binary file that specifies all the domain classes, and domain objects and their constraints. Application Definition 174 includes both a logical specification and their bindings to an implementation. Application Implementation 177 is a set of compiled libraries that implements the classes and objects specified in the Application Definition 174.

Class

Class is the fundamental concept of Object Oriented Programming. Domain is the equivalent concept in Relational Databases. Data type, or Type, commonly used to mean Class or Domain. Type is a more general concept. We might have types that are not classes. We will use only Class, instead of type, to emphasize our intention to firmly base the Meta Model 160 on Object Oriented Programming.

A Class defines methods that collectively specify the external behavior of the objects that are instances of that Class. A class may also have public attributes.

Object

An object can be anything. An object may have one or more classes. Every object has at the least one class. We will use object to refer to an instance of a Class.

Inheritance

Class B inherits Class A, if Class B provides all of the external behavior of Class A. In other words, Class B is a subtype of Class A or Class A is super class of Class B.

Object Name

Object names start with lower case letters and classes start with upper case letters. For example, "relation" refers to an instance of "Relation" class. Object names are used when discussing properties of instances of a class. For example, "A relation must have a unique key" means that every instance of the Relation Class has a unique key.

Current Object Reference

The reference to the object itself is this. For example, in description of method getName( ), "Gets the name of this", this refers to the object on which getName( ) is called.

Variables

The concept of variable is inherited from the host programming language. Variable names used in the text follow the programming element conventions. For example, in the description of method setName(String newName), "Sets the name of this to newName", newName refers to a variable that points to a string.

Meta Knowledge Model 165

The classes Key, Relation, Fact, and Thing are the building blocks of a knowledge model. The Meta Knowledge Model 165 may specify them as abstract classes. All application specific components must be a subclass of one of these classes.

Key

The Key class is the base class of a unique identifier of an object. A key is required to be unique within the scope of the object it refers to. When an object is created, it is stored by value in only one relation. All other relations refer to the same object by its key.

A key identifies an object by name. Two objects are the same if they have the same key. Typically a key is a wrapper around a string or an integer. Three most common sub classes of Key are StringKey, DateKey and IntegerKey. They have methods to construct keys from strings, dates, and integers. They also have methods to get the string, date, and integer values of the keys.

Key Class is an abstract class.

public Key getKey( )

Returns the key of a key. The key of a key is itself. All key classes are sub classes of Key.

The StringKey Class is a sub class of Key.

public StringKey(String newValue)

Constructs a key out of a String.

public String getAsString( )

Returns the string value of the key. This is the same string that is used to construct the key.

public int compareTo(Object newKey)

Compares two keys. The input is another key of the same type: StringKey. This method delegates the comparison of two keys to the comparison of their string values.

public boolean equals(Object obj)

Compares two keys for equality. The input is another key of the same type: StringKey. Two keys are equal if they compare to be the same.

public int hashCode( )

Returns the hash code of the key. The hash code of the key is the hash code of the string value of the key.

IntegerKey Class is a sub class of Key.

public IntegerKey(int newValue)

Constructs a key out of an int value.

public int compareTo(Object newKey)

Compares two keys. The input is another key of the same type: IntegerKey. This method delegates the comparison of two keys to the comparison of their integer values.

public int getAsInt( )

Returns the integer value of the key. This is the same integer that is used to construct the key.

public boolean equals(Object obj)

Compares two keys for equality. The input is another key of the same type: IntegerKey. Two keys are equal if they compare to be the same.

public int hashCode( )

Returns the hash code of the key. The hash code of the key is the integer value of the key.

The DateKey Class is a sub class of Key.

public DateKey(Date newValue)

Constructs a key out of a Date value.

public int compareTo(Object newKey)

Compares two keys. The input is another key of the same type: DateKey. This method delegates the comparison of two keys to the comparison of their date values.

public Date getAsDate( )

Returns the date value of the key. This is the same date that is used to construct the key.

public boolean equals(Object obj)

Compares two keys for equality. The input is another key of the same type: DateKey. Two keys are equal if they compare to be the same.

public int hashCode( )

Returns the hash code of the key. The hash code of the key is hash code of the date.

Thing

Thing is the abstract base class of all objects in the Run-time 162. The Thing class has the methods that are common to all of the Run-time 162 classes.

Thing Class public String getDefinition( );

Gets the name of the knowledge definition of this.

public void setDefinitionName(String newDefinitionName);

Sets the name of the knowledge definition of this.

public abstract Key getKey( );

Gets the key of this. The method getKey( ) ensures that all objects in the data model have a key that identifies the logical object.

The ThingList Class is the base class of domain things that represents an ordered list of things.

public ThingList( );

Construct an empty thing list.

public void add(int index, Thing thing);

Adds a thing at the specified position. The index must be zero or positive.

public boolean add(Thing thing);

Adds a thing to the end of the list.

public boolean addAll(ThingList newThings);

Adds all the thing of newThings to the end of this.

public boolean addAll(int startindex, ThingList things);

Adds all the thing of a thingList starting at the startIndex. If list contains elements beyond position i, they are overridden.

public Thing set(int index, Thing newThing);

Sets the thing at index to newThing.

public Thing get(int index);

Gets the thing at index.

public Thing remove(int index);

Removes the thing at index.

public void clear( );

Removes the all thing of this.

public boolean contains(Thing newThing);

Searches the list for an item whose key matches the key of the newThing. Returns true if a match is found. Return false otherwise.

public int size( );

Returns the number of things in this.

public void trimToSize( );

Trims the size of the list to the number of things in the list.

public void ensureCapacity(int newCapacity);

Sets the minimum capacity of this to newCapacity.

public boolean isEmpty( );

Returns whether this is empty.

public int indexOf(Thing thing);

Returns the index of the thing. If thing does not exist, it returns −1.

public Key getKey( );

Returns the key of this.

The ThingSet Class is the base class of domain things that represent a set of objects.

public ThingSet( );

Construct an empty thing set.

public int size( );

Returns the number of things in the set.

public boolean isEmpty( );

Returns whether the set is empty.

public boolean contains(Thing newThing);

Searches the set for an item whose key matches the key of the newThing. Returns true if a match is found. Return false otherwise.

public Thing[ ] toArray( );

Gets the things in the set as array of things.

public boolean add(Thing thing);

Adds a thing to this.

public boolean addAll(ThingSet thingSet);

Adds all the thing of a thingSet to this.

public boolean remove(Thing thing);

Removes the thing from this.

public boolean removeAll(ThingSet thingSet);

Removes all the things of thingSet from this.

public void clear( );

Removes all the things of this.

public Key getKey( );

Returns the key of this.

The Fact Class is the abstract base class of all objects that represent a fact.

public abstract int getSize( );

Returns the cardinality of the fact; the number of things in the facts.

public abstract boolean set(int i, Thing thing);

Sets the thing at the position i. Input thing is an object whose subtypes include Thing. If the requested position i is negative or greater than or equal to the number of things, no value is set.

public abstract Thing get(int i);

Returns the thing stored at the position i. Return value is an object whose subtypes include Thing. If the requested position i is negative or greater than or equal to the number of things, it returns null.

public abstract Thing get(Key key);

Returns the thing whose key is equal to key. If no matching key exists, it returns null. The return value is an object whose subtypes include Thing.

public abstract Thing[ ] get( );

Returns all the thing of the fact. The returned array of things can have only those objects whose subtypes include Thing.

public abstract boolean update(int i, Thing thing);

Replaces the thing at position i with the thing. If requested position i is greater than or equal to the number of things of the fact, or if i negative, it does not modify the fact. In other words, only existing things can be updated.

public abstract boolean update(Key key, Thing thing);

Replaces the thing whose key is equal to key. If no matching key exists, it does not update the fact.

public abstract boolean delete(int i);

Deletes the thing at position i. If requested position i is greater than or equal to the number of thing in the fact, or if i negative, it does not modify the fact. Only existing things can be deleted. After the successful deletion, the size of the thing list is still the same. The position i has a null value after deletion.

public abstract boolean delete(Key key);

Deletes the thing whose key is equal to key. If no matching key exists, it does not modify the fact. After the successful deletion, the size of the thing list is still the same. The position i has a null value after deletion. If multiple matches are found, all matched things are deleted.

public abstract boolean deleteAll( );

Delete all things of the fact.

public Key getKey( );

Return the key of the fact. getKey( ) is overridden in a sub type to return the desired key.

Simple Fact

The Simple Fact class is an implementation of the abstract Fact class. A simple fact has only one thing. The default key of the fact is the key of the thing. A relation with simple facts is equivalent to a hash table. The thing of the fact can be any sub type of Thing, including Key, and Relation.

One-to-One Fact

This class is an implementation of abstract Fact class. A One-to-One fact has two things. The default key of the fact is the key of the first thing. The things of the fact can be any sub type of Thing, including Key, and Relation.

One-to-Many Fact

A fact whose cardinality is greater than 2 is required to extend this class. The default key of the fact is the key of the first thing. The things of the fact can be any sub type of Thing, including Key, and Relation.

Relation

A Relation is the container for a set of facts and the predicate of the contained facts. The name of the relation is the name of the predicate. The predicate restricts the types of facts that can be inserted into the relation.

Relation Class abstract public String getName( );

Gets the name of a relation. Name identifies the logical name of the relation object. The application designer assigns the logical name. Name is the default key for the relation. If name is not unique, getKey( ) method is overridden to provide a unique key.

abstract public void setName(String newName);

Sets the name of a relation. Every relation has a name. The name is expected to be descriptive of the purpose of the relation.

abstract public boolean insert(Fact fact);

Inserts a fact to the relation. The key of the fact cannot be null. The type of the fact must match with Fact or with one of sub types of Fact. If key type does not match, it raises InvalidKeyException. If key exists, it fails. It raises DuplicateKeyException. If key is null, it raises NullKeyException.

abstract public boolean update(Fact newFact);

If there is a fact whose key matches with key of newFact, it replaces that fact with newFact. If no matching fact is found, relation is not updated. If key newFact is null, relation is not updated.

abstract public boolean delete(Fact newFact);

If there is a fact whose key matches with key of the newFact, it deletes that fact. If key of the newFact is null, relation is not updated.

abstract public boolean delete(Key newKey);

If there is a fact whose key matches with newKey, it deletes that fact. If newKey is null, relation is not updated.

abstract public boolean deleteAll( );

Deletes all the facts in this.

abstract public boolean insert(Relation r);

Inserts all the facts of the relation r into this. If r is null, it raises InvalidRelationException. Key and the Fact type of relation r must match the key and fact type of this. Otherwise InvalidRelationException is raised. This operation loops over the facts of r and inserts each one of them into this.

abstract public boolean update(Relation r);

Update all the facts of the relation r in this. If r is null, it raises InvalidRelationException. Key and the Fact type of relation r must match the key and fact type of this. Otherwise InvalidRelationException is raised. This operation loops over the facts of r and updates each one of them.

abstract public boolean delete(Relation r);

Deletes all the facts of the relation r from this. If r is null, it raises InvalidRelationException. Key and the fact type of relation r must match the key and fact type of this. Otherwise InvalidKeyException is raised. This operation loops over the keys of r and deletes each one of them from this.

abstract public int getSize( );

Returns the number of facts in this.

abstract public Fact get(Key newKey);

Returns the fact whose key matches newKey. If no matching record is found, it returns null.

abstract public Fact[ ] getAll( );

Returns all the facts of this as an array.

abstract public boolean contains(Key newKey);

Returns true if there is a fact whose key matches newKey. If no matching record is found, it returns false.

abstract public Relation intersect(Relation r);

Returns the facts that exist in r and this. If r is null, it raises InvalidRelationException. Key and the Fact type of relation r must match the key and fact type of this. Otherwise InvalidRelationException is raised.

abstract public Set keys( );

Returns the set of keys of this.

abstract public Key getKey( );

Returns the key of this.

MapRelation Class

MapRelation is the default implementation of Relation. As the name suggests, MapRelation uses a HashMap to store and index facts.

Meta Logic Model 166

The System 100 may have two types of fact: base and derived

A base fact exists independently of other facts. We cannot derive them from other facts. They are the axioms of the System 100. Derived facts are consequences of base facts. We refer to the ability to derive facts from base facts as intelligence. In the System 100, intelligence is represented as a Relation Function, FIG. 3.

A client of the System 100 may request the execution of a relation function. Or the Run-time 162 may execute a set of relation functions to enforce rules and constraints. The ability of the Run-time 162 to enforce the rules and constraints is provided by Relation Function, Event, and Event Handler. The Meta Logic Model 166 specifies the Relation Function, Event, Event Handler, and their supporting classes.

Relation Function

Relation functions are special in that they take relations as input and return a relation. A relation function is a generalization of both a database query and function concept in programming languages. The System 100 stores relation functions in the Catalog 164. Relation Function is a sub type of Thing. Relation Function is an abstract class. The application provides the implementation.

Figure 2:
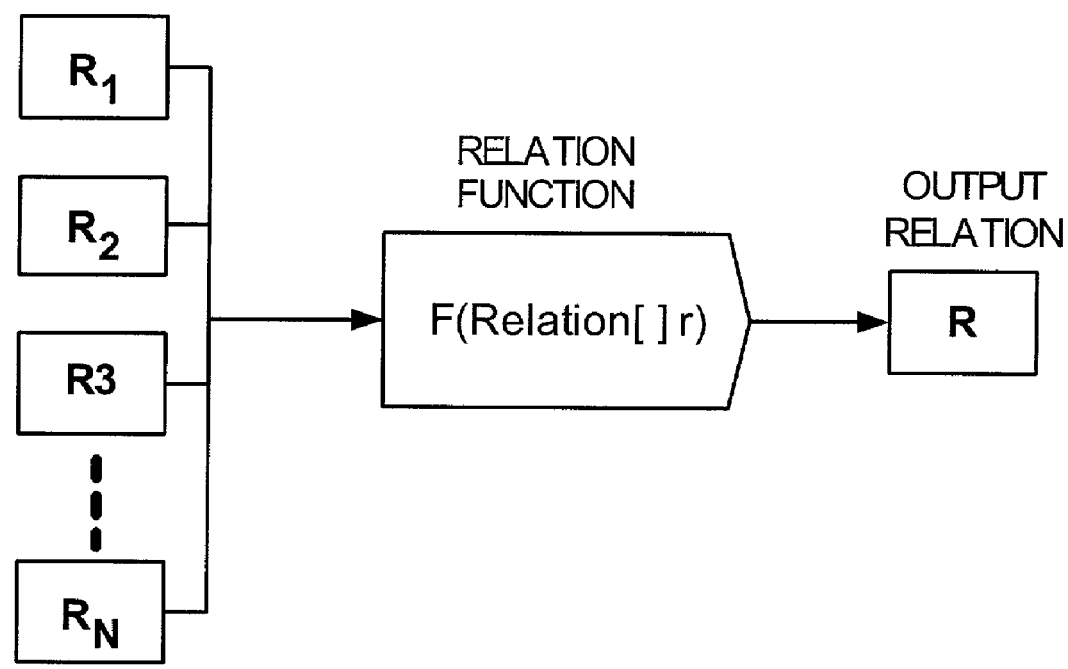
FIG. 2 depicts a block diagram of a Relation Function, according to an embodiment of the invention.
Figure 4:
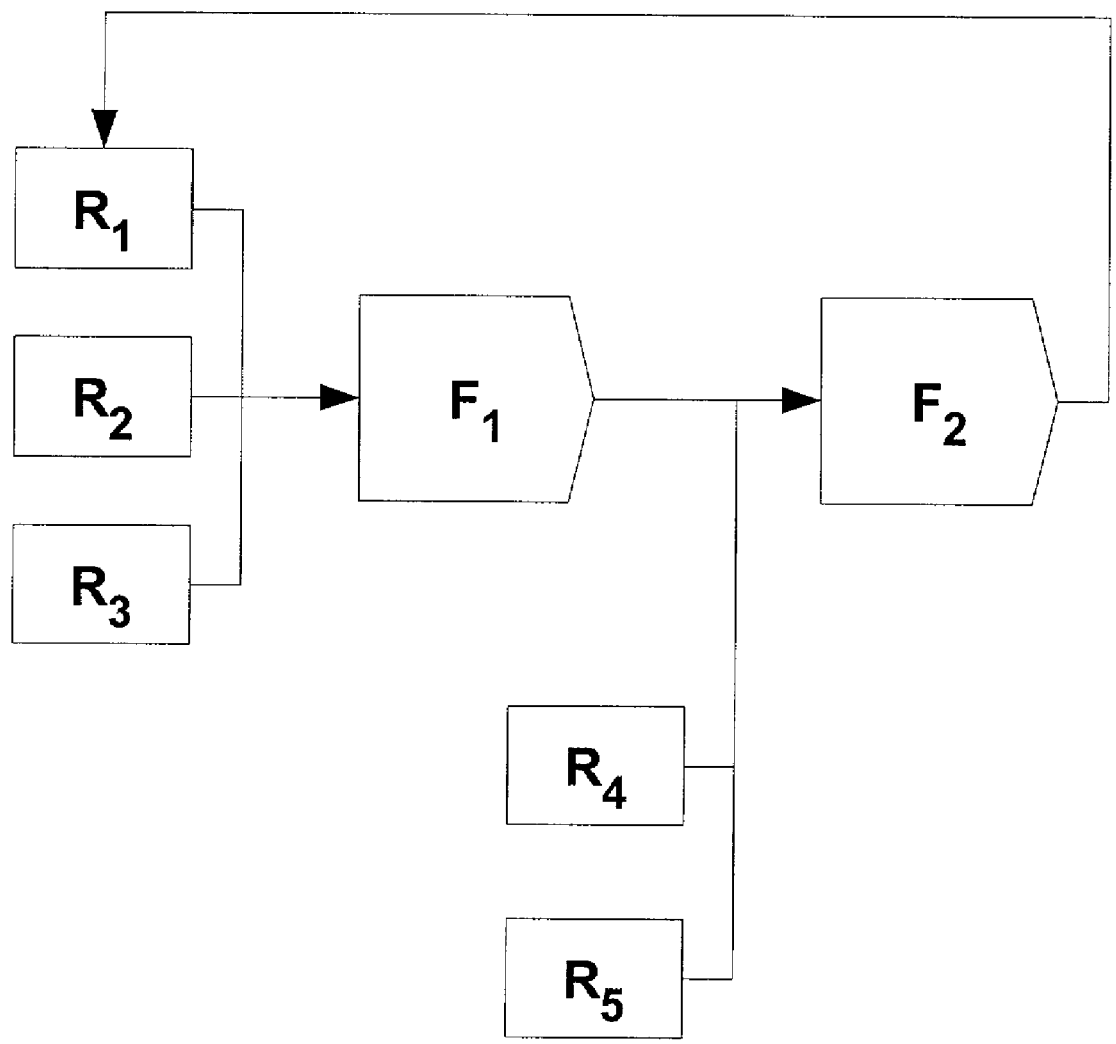
FIG. 4 depicts a block diagram of how relation functions and relations form a closed algebra, according to an embodiment of the invention.
Figure 5:
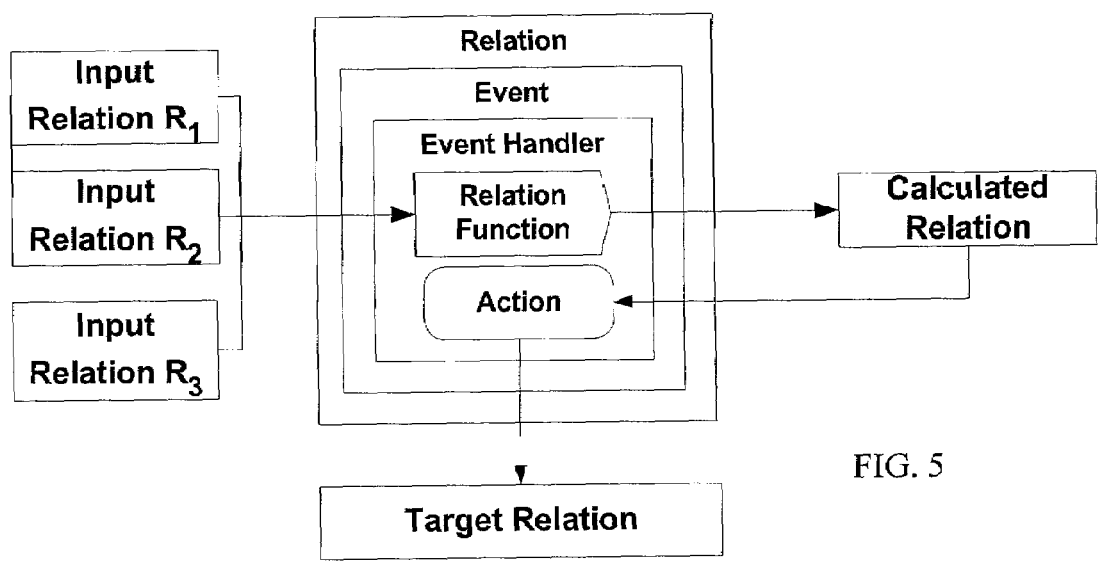
FIG. 5 depicts a block diagram of the relationship between the Event, Event Handler, and Relation Function, according to an embodiment of the invention.

FIG. 2 graphically depicts the Relation Function. A relation function may be recursive. FIG. 4 graphically depicts a recursive relation function. Relation functions form a closed algebra. Due to its closure property, relation functions can be cascaded to construct complex logic. FIG. 4 graphically depicts how relation functions can be cascaded. FIG. 5 depicts how events and relation functions cooperate to implement rules.

Figure 6:
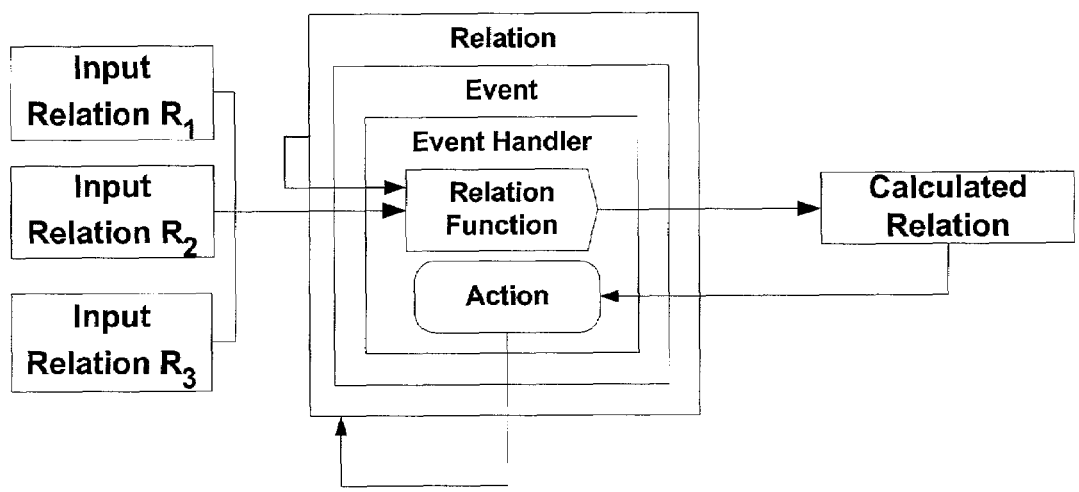
FIG. 6 depicts a block diagram of a Recursive Relation Function, according to an embodiment of the invention.

FIG. 6 depicts how events and recursive relation functions cooperate to implement cascaded rules and actions.

Relation Function Class

Relation Function is an abstract sub class of Thing.

public String getName( )

Gets the logical name of this. Logical name uniquely identifies a relation function. Logical names are assigned by the application. The name is the default key of a relation function.

public void setName(String newName)

Sets the logical name of this to newName.

public abstract Relation execute(Relation[ ] r)

Executes the relation function. Application designer specifies what execute does. Application developers implement execute method in a sub type of Relation Function. Input is an ordered list of relations. The Run-time 162 ensures the type safety at run time.

public Key getKey( )

Return the key of this. Default implementation return a StringKey constructed from the name of this.

Event

An event is change in a relation. The Run-time 162 may monitor the changes to the relations to ensure that change is allowed or to take an action.

An event is associated with a relation. Typical changes are insertion, deletion, and update of facts. An event may apply to any fact or a number of specific facts. Once an event is detected, an action may need to be taken. An event has an event handler that represents the action. An event and event handler pair represents a rule:

If<event>then <eventHandler>

The designer of Application 161 specify the events and their handlers. Typically, there is no need to override the Event.

An event may have scopes of Application or Session Application and Session will be discussed later in detail. When an event is application scope, it applies to all sessions of the application. When it is session scope, it applies to specific session in which it is declared.

An event has one of the following types: Insert, Delete, Update, Add, or Drop

These are the five types of operations on relations. Since all knowledge is stored in relations, every event is one of these types.

There may be two levels of an event: Relation and Fact.

When an event has the Relation Level, it applies to any fact in the relation. When it is Fact Level, it only applies to specified facts.

Event Class

Event is a sub class of Thing.

public Event( )

Constructs an event.

public String getName( )

Gets the name of this as a string. A name uniquely identifies an event within its scope. If scope is Session, name must be unique within the session. If scope is Application, name must be unique within the application.

public void setName(String newName)

Sets the name of this to newName.

public String getRelationName( );

Gets name of the relation to whom event is attached.

public void setRelationName(String newRelationName);

Sets the name of the relation to whom event is attached.

public Relation getKeys( )

Returns the keys of facts to which event are applicable. If the level of the event is Relation, returns null. When the level is Relation, event is applicable to all facts of the relation.

public int getPriority( )

Returns the priority of the event. The highest priority is 0. The priority decreases with increasing value. The Run-time 161 checks highest priority event first. Default value is zero. When a set of events has the same priority, their keys prioritize them. The smallest key value has the highest priority.

public void setPriority(int newPriority)

Sets the priority of this to newPriority.

public EventScope getScope( )

Returns the scope of this. Valid scopes are Session, and Application When the scope is Session event is monitored for the current session only. When the scope is Application event is monitored for all session of the application only.

public void setScope(EventScope newScope)

Sets the scope of this to newScope.

public EventLevel getLevel( )

Returns the level of this. Valid level are Relation and Fact. When the scope is Relation event is monitored for every fact of the target relation. Otherwise it is monitored for a specified set of facts.

public void setLevel(EventLevel newLevel)

Sets the level of this to newLevel.

public String getEventHandlerName( )

Gets the event handler name of this. When the event is detected, the event handler is executed.

public void setEventHandlerName(String newEventHandlerName)

Sets the event handler of this to newEventHandlerName.

public Key getKey( )

Returns the key of this.

Event Handler

An event handler is a specification of what action will be taken and where. An event handler may have a Relation Function (what) and a Target Relation (where).

When an event handler is invoked, relation function is executed. The action is an operation between the output of the relation function and the target relation.

An event handler may have the following action types: Clear, Add, Drop, Replace, Insert, Delete, or Update.

An action type determines the operation on the target relation.

Class ActionType

Action is a super class of EnumeratedType.

public static final int Clear=1;

Removes all facts from the target relation.

public static final int Add=2;

Adds the target relation to Catalog 164. Target relations within the scope of the event are added. For example, if the scope of the event is Session, it is added to the session of the triggered event. If scope is Application, target relation is added to all the sessions of the application.

public static final int Drop=3;

Drops the target relation from Catalog 164. Target relations within the scope of the event are dropped. For example, if the scope of the event is Session, it is dropped from the session of the triggered event. If scope is Application, target relation is dropped from all the sessions of the application.

public static final int Replace=4;

Replaces the target relation in a Catalog 164. Target relations within the scope of the event are replaced. For example, if the scope of the event is Session, it is replaced in the session of the triggered event. If scope is Application, target relation is replaced in all the sessions of the application.

public static final int Insert=5;

Inserts into the target relation the facts of the relation returned by the relation function. Target relation must be within the scope of the event.

public static final int Delete=6;

Deletes from the target relation the facts of the relation returned by the relation function. Target relation must within the scope of the event.

public static final int Update=7;

Updates in the target relation the facts of the relation returned by the relation function. Target relation must be within the scope of the event.

public ActionType(int newType)

Constructs an action type from its integer id newType.

public String getDescription( )

Gets the description of the action type.

public void setDescription(String newDescription)

Sets the description of the action type to newDescription.

EventHandler Class

EventHandler is a sub class of Thing.

public EventHandler( )

Constructs and EventHandler.

public String getName( )

Gets the name of this. Name is the key of this.

public void setName(String newName)

Sets the name of this to newName.

public ActionType getActionType( )

Gets the actionType of this.

public void setActionType(ActionType newActionType)

Sets the actionType of this to newActionType.

public String getRelationFunctionName( )

Gets the name of the relation function that is to be executed. The name is the logical name. The Run-time 162 may map the logical name to a physical implementation at run time.

public void setRelationFunctionName(String newRelationFunctionName)

Sets the name of the relation function that is to be executed to newRelationFunctionName.

public String getTargetRelationName( )

Gets the name of the relation that is to be acted upon. The name is the logical name. The Run-time 162 may map the logical name to a physical implementation at run time.

public void setTargetRelationName(String newTargetRelationName)

Sets the name of the relation that is to be acted upon to newTargetRelationName.

public Key getKey( )

Gets the key of this.

Run-Time Model 171 and Run-Time 162

Run-time Model 171 consists of Kernel, Application, and Session. FIG. 10 shows the Run-time Model described using the Unified Modeling Language (UML) notation. Run-time 162 consists of an instance of Kernel Class, a set of instances of Application Class, and a set of instances of Session Class.

Class Application public String getVersion( );

Gets the version of this.

public void setVersion(String newVersion);

Sets the version of this to newVersion.

public String getName( );

Gets the name of this.

public void setName(String newName);

Sets the name of this to newName.

public void addRelationDefinition(RelationDefinition relationdefinition, String name);

Adds a relation definition to this.

public RelationDefinition getRelationDefinition(String name);

Gets a named relation definition.

public void dropRelationDefinition(String name);

Drops a relation definition.

public void addRelation(String relationName, String relationDefinitionName);

Adds a relation to this.

public Relation getRelation(String name);

Gets a relation.

public void dropRelation(String name);

Drops a relation.

public void addEvent(String relationName, String eventName, Event event);

Adds an event to this.

public void dropEvent(String relationName, String eventName);

Drops an event.

public Event getEvent(String relationName, String eventName);

Gets an event.

public void addEventHandler(String eventHandlerName, EventHandler event);

Adds an event handler to this.

public void dropEventHandler(String eventHandlerName);

Drops an event handler.

public Event getEventHandler(String eventHandlerName);

Gets an event handler.

public void addRelationFunctionDefinition( RelationFunctionDefinition relationFunctionDefinition, String name);

Adds a relation function definition to this.

public RelationFunctionDefinition getRelationFunctionDefinition(String name);

Gets a relation function definition.

```
public void dropRelationFunctionDefinition(String
name);
    Drops a relation function definition.
public void addRelationFunction(String relationName,
String relationDefinitionName);
    Adds a relation function to this.
public RelationFunction getRelationFunction(String relationFunctionName);
    Gets a relation function.
public void dropRelationFunction(String name);
    Drops a relation function.
public void addThingDefinition(String thingDefinitionName, ThingDefinition keyDefinition);
    Adds a thing definition to this.
public void dropThingDefinition(String thingDefinitionName);
    Drops a thing definition.
public Event getThingDefinition(String thingDefinitionName);
    Gets a thing definition.
public void addKeyDefinition(String keyDefinitionName, KeyDefinition keyDefinition);
    Adds a key definition to this.
public void dropKeyDefinition(String keyDefinitionName);
    Drops a key definition.
public Thing getKeyDefinition(String keyDefinitionName);
    Gets a key definition.
public void addFactDefinition(String factDefinitionName, FactDefinition factDefinition);
    Adds a fact definition to this.
public void dropFactDefinition(String factDefinitionName);
    Drops a fact definition.
public FactDefinition getFactDefinition(String factDefinitionName);
    Gets a fact definition.
public void addReferenceDefinition(String referenceDefinitionName, ReferenceDefinition referenceDefinition)
    Adds a reference definition.
public void dropReferenceDefinition(String referenceDefinitionName);
    Drops a reference definition.
public ReferenceDefinition getReferenceDefinition
(String referenceDefinitionName);
    Gets a reference definition.
public void startTransaction( );
    Starts a transaction.
public void commitTransaction( );
    Commits a transaction.
public void rollbackTransaction( );
    Rollbacks a transaction.
public Relation execute(String relationFunctionName);
    Executes a relation function.
public Key getKey( );
    Gets the key of this.
Class Session
public Application getApplication( );
    Loads an application to this.
public Key getKey( )
    Gets the key of this.
Class Kernel
public void addUser(String userName, String password);
    Adds a user to this.
public void dropUser(String userName);
    Drops a user.
public void grant(String touser, String appName);
    Grants access privilege to a user for an application.
public Session connect(String userName, String password, String appName);
    Opens a session to an application.
public void removeSession(Key key);
    Closes a session.
public Key loadApplication(File applicationDefinition);
    Loads an application to this.
public void unloadApplication(Key key);
    Unloads an application.
public Key getKey( );
    Gets the key of this.
```

The network adapter 145 facilitates communication between the electronic device 110 and the network 120. The network adapter 145 provides the electronic device 110 with a means of electronically communicating information with a remote electronic device, not shown. In addition, in another embodiment, the network adapter 145 may support distributed processing, which enables the electronic device 110 to share a task with other devices linked to the network 120. Although the network adapter 145 is shown as part of the electronic device 110, in another embodiment they may be packaged separately. Although only one network adapter 145 is shown, in other embodiments multiple network adapters of the same or of a variety of types may be present.

The input device 150 is that part of the electronic device 110 that accepts input from a user. In an embodiment, the input device 150 may be a keyboard, but in other embodiments, the input device 150 may be a pointing device, mouse, trackball, keypad, touchpad, touch screen, pointing stick, microphone, or any other appropriate input device. Although only one input device 150 is shown, in other embodiments any number of input devices of the same or of a variety of types may be present. In another embodiment, the input device 150 may not be present.

The output device 155 communicates information to the user of the electronic device 110. The output device 155 may be a cathode-ray tube (CRT) based video display well known in the art. But, in other embodiments the output device 155 may be replaced with a liquid crystal display (LCD) based or gas, plasma-based, flat-panel display. In still other embodiments, any appropriate display device may be used. In yet other embodiments, a speaker that produces audio output may be used. Although only one output device 155 is shown, in other embodiments, any number of output devices of different types or of the same type may be present. In other embodiments, the output device 155 might not be present.

The bus 180 may represent one or more busses (e.g., PCI, ISA (Industry Standard Architecture), X-Bus, EISA (Extended Industry Standard Architecture), or any other appropriate bus and/or bridge (also called a bus controller).

The electronic device 110 may be implemented using any suitable hardware and/or software, such as a personal computer or other electronic computing device. Portable computers, laptop or notebook computers, and mainframe computers are examples of other possible configurations of the electronic device 110. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted. Thus, an embodiment of the invention may apply to any hardware configuration that supports a Meta Model 160, Run-time 162, and Application 161.

As will be described in detail below, aspects of an embodiment pertain to specific apparatus and method elements implementable on electronic devices. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium (e.g., read-only memory devices attached to or within an electronic device, such as a CD-ROM readable by a CD-ROM drive);

(2) alterable information stored on a rewriteable storage medium (e.g., a hard disk drive or diskette); or (3) information conveyed to an electronic device by a communications medium, such as through a computer or telephone network accessed via network adapter 145, including wireless communications.

Such signal-bearing media, when carrying machine-readable instructions that direct the functions of the present invention, represent embodiments of the present invention.

FIG. 2 depicts a block diagram of a Relation Function, according to an embodiment of the invention. The Relation Function comprises an object-oriented representation of actions, queries, rules, constraints, or functions. The Relation Function receives a set, or array, of Relations as input and returns a Relation as output. The Relation Function can implement a query, an algorithm, a rule, a constraint, or a function.

Figure 3:
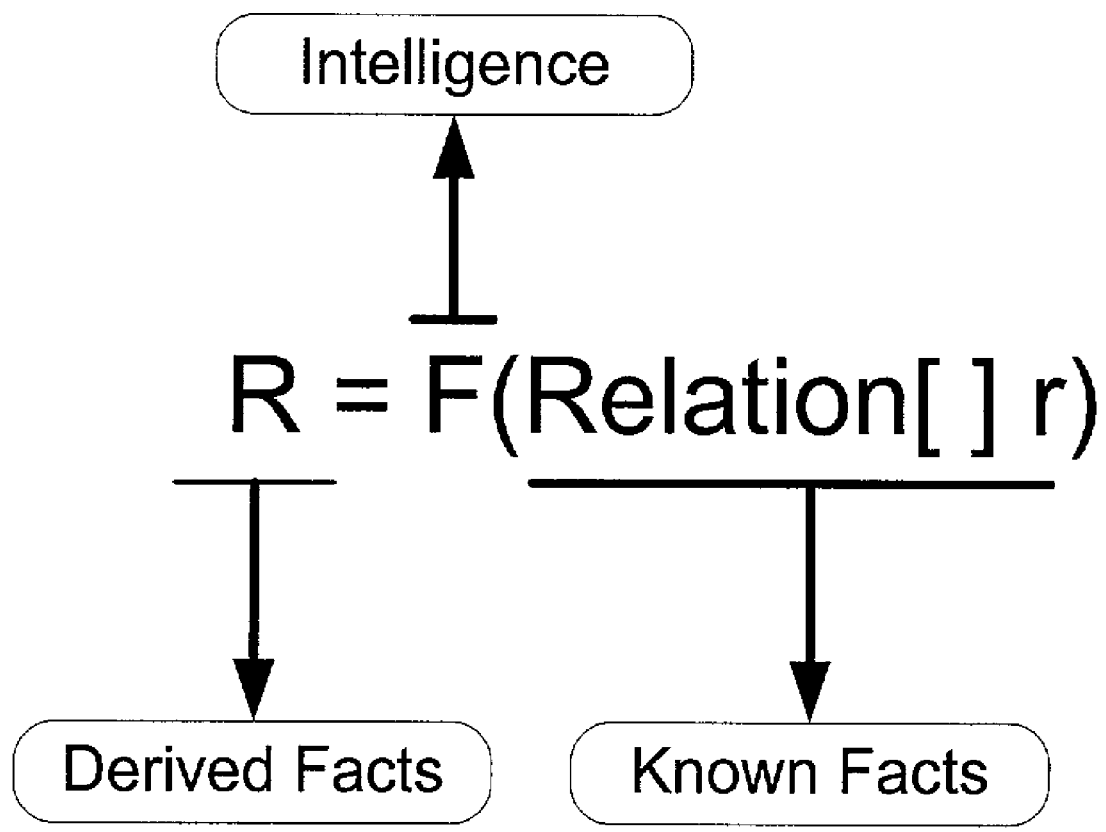
FIG. 3 depicts a block diagram of how new knowledge is derived from existing knowledge, according to an embodiment of the invention.

FIG. 3 depicts a block diagram of how new knowledge is derived from existing knowledge, according to an embodiment of the invention. The relation function F represents an algorithm to calculate or derive new facts that is returned in relation R.

FIG. 4 depicts a block diagram of how Relation Functions and Relations form a closed algebra, according to an embodiment of the invention. A Relation Function can be substituted for a relation and vice versa.

FIG. 5 depicts a block diagram of the relationship between the Event, Event Handler, and Relation Function, according to an embodiment of the invention. A relation can have events. An event has an event handler. An event handler has a relation function, an action, and a target relation. The action is the operation between the output of the relation function and the target relation.

FIG. 6 depicts a block diagram of a recursive event, according to an embodiment of the invention. A recursive event modifies the relation that generated the event. Recursion ends when the calculated relation is empty.

FIG. 7 depicts a UML representation of the Meta Knowledge Model 165, according to an embodiment of the invention.

FIG. 8 depicts a UML representation of the Meta Logic Model 166, according to an embodiment of the invention.

FIG. 9 depicts a UML representation of the Knowledge Definition Model 167, according to an embodiment of the invention.

FIG. 10 depicts a UML representation of the Run-time Model 171, according to an embodiment of the invention.

Figure 11:
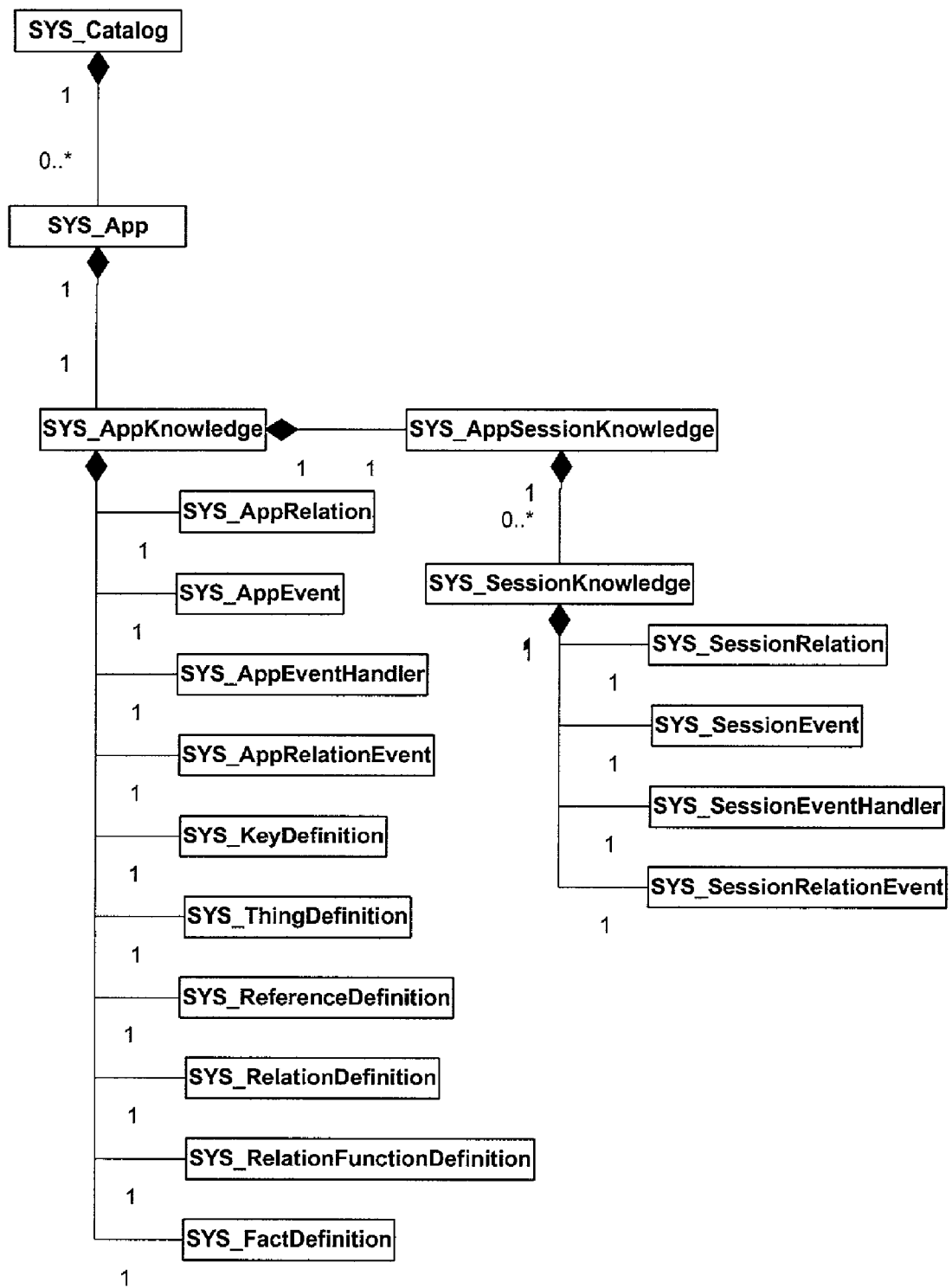
FIG. 11 depicts a UML representation of a Catalog Model, according to an embodiment of the invention.

FIG. 11 depicts a UML representation of the Catalog Model 169, according to an embodiment of the invention.

Figure 12:
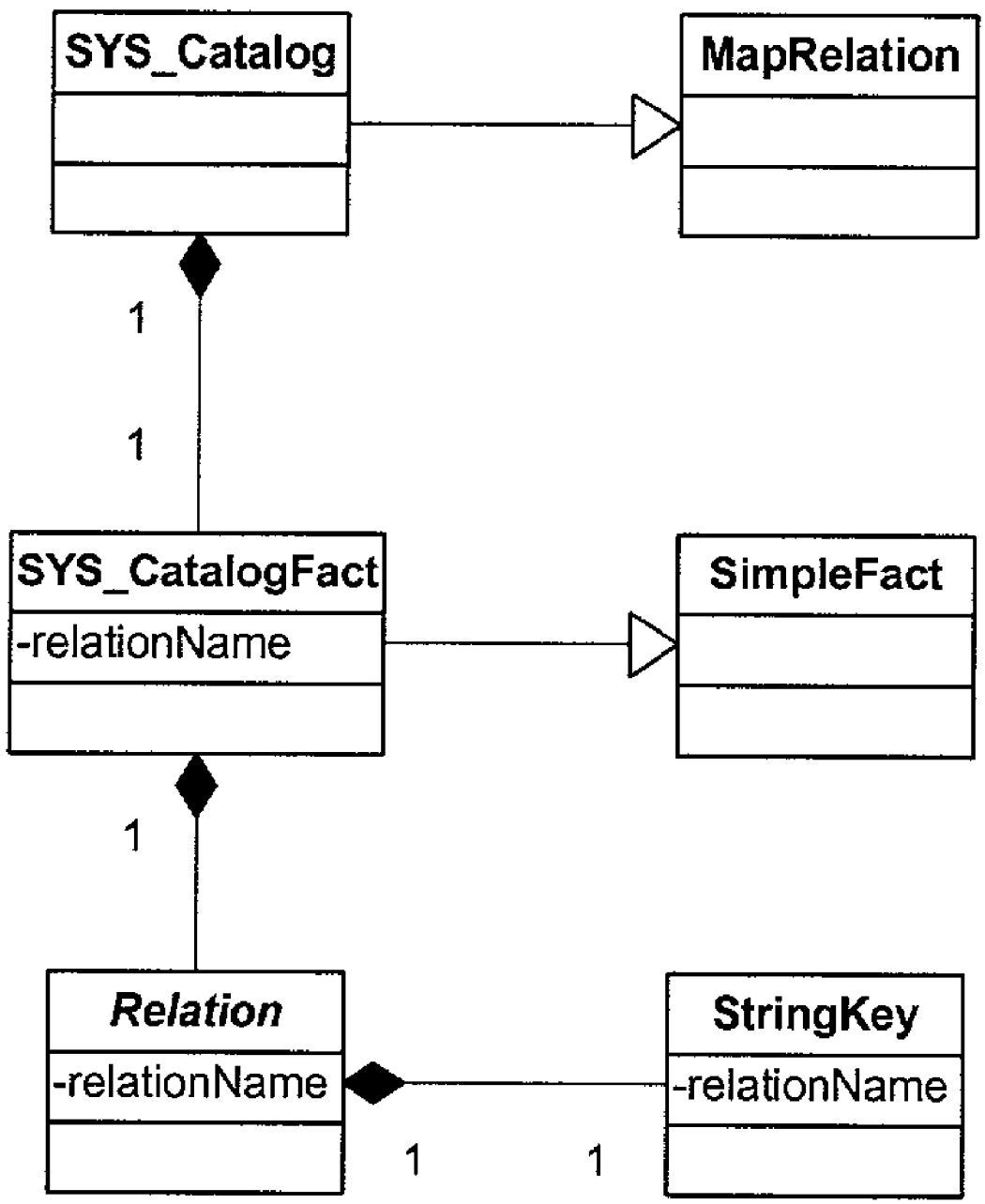
FIG. 12 depicts a UML representation of a SYS_Catalog, according to an embodiment of the invention.

FIG. 12 depicts a LML representation of a SYS_Catalog, according to an embodiment of the invention. SYS_Catalog is the root relation that stores all other relations. An instance of SYS_Catalog is created by the kernel automatically.

Figure 13:
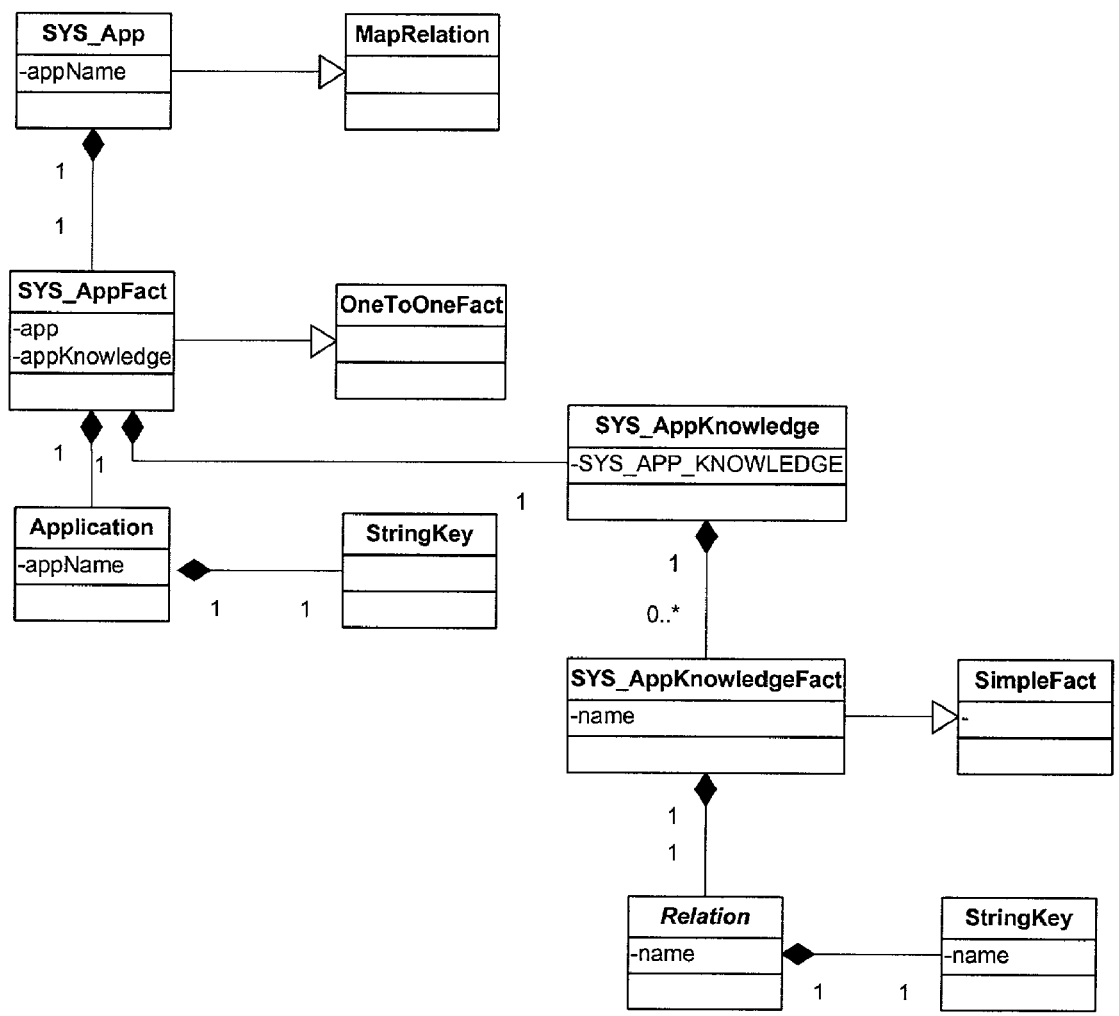
FIG. 13 depicts a UML representation of SYS_App and SYS_AppKnowledge, according to an embodiment of the invention.

FIG. 13 depicts a UML representation of SYS_App and SYS_AppKnowledge, according to an embodiment of the invention. SYS_App is a root relation of the Application Catalog.

Figure 14:
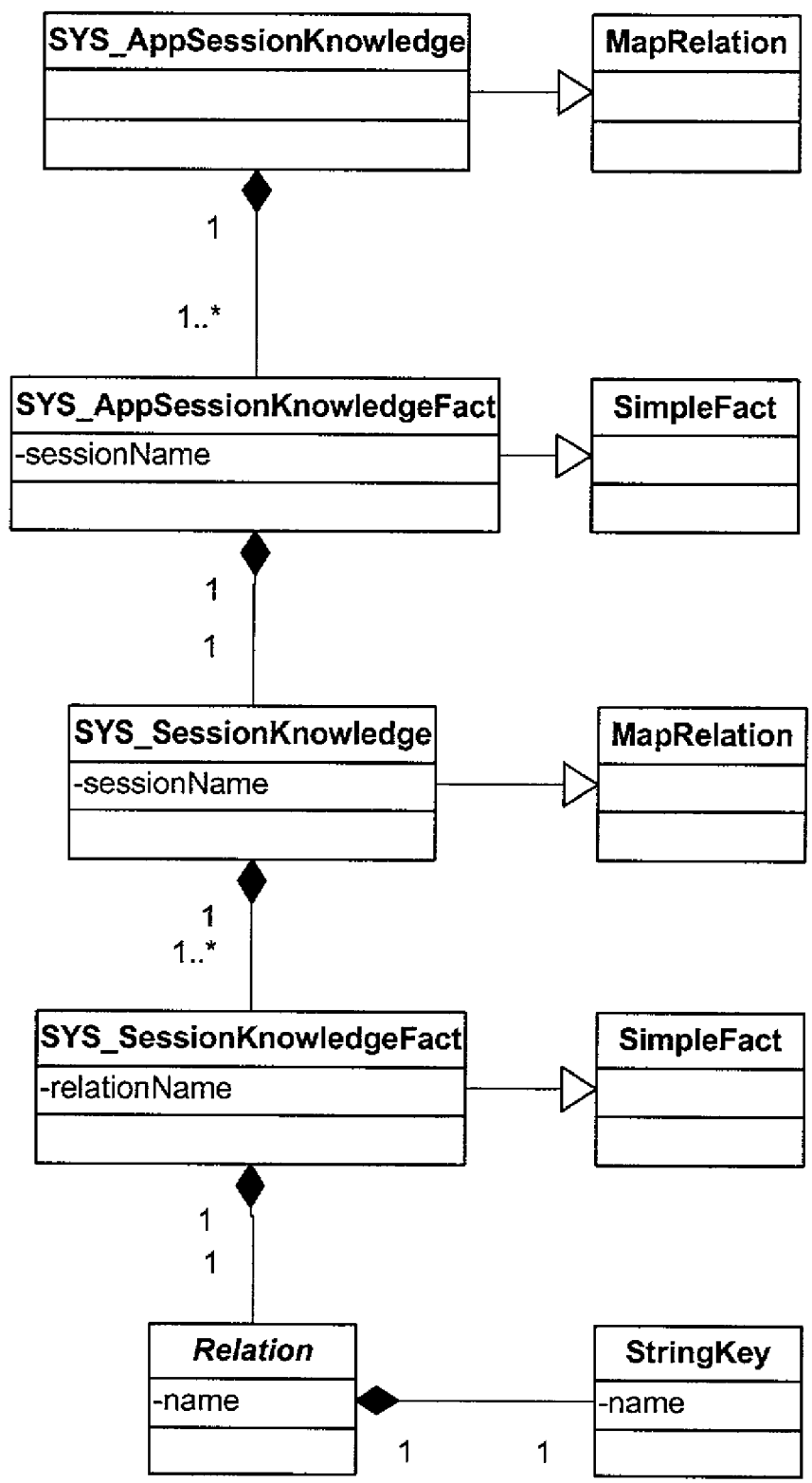
FIG. 14 depicts a UML representation of SYS_AppSessionKnowledge and SessionKnowledge, according to an embodiment of the invention.

FIG. 14 depicts a UML representation of SYS_AppSessionKnowledge and SessionKnowledge, according to an embodiment of the invention. SYS_AppSessionKnowledge is the root relation of session specific knowledge. SYS_AppSessionKnowledge and the relations contained in it form the Session Catalog. An instance of a session catalog is created for each session. Session catalog is destroyed when user closes the session or when the session expires.

Figure 15:
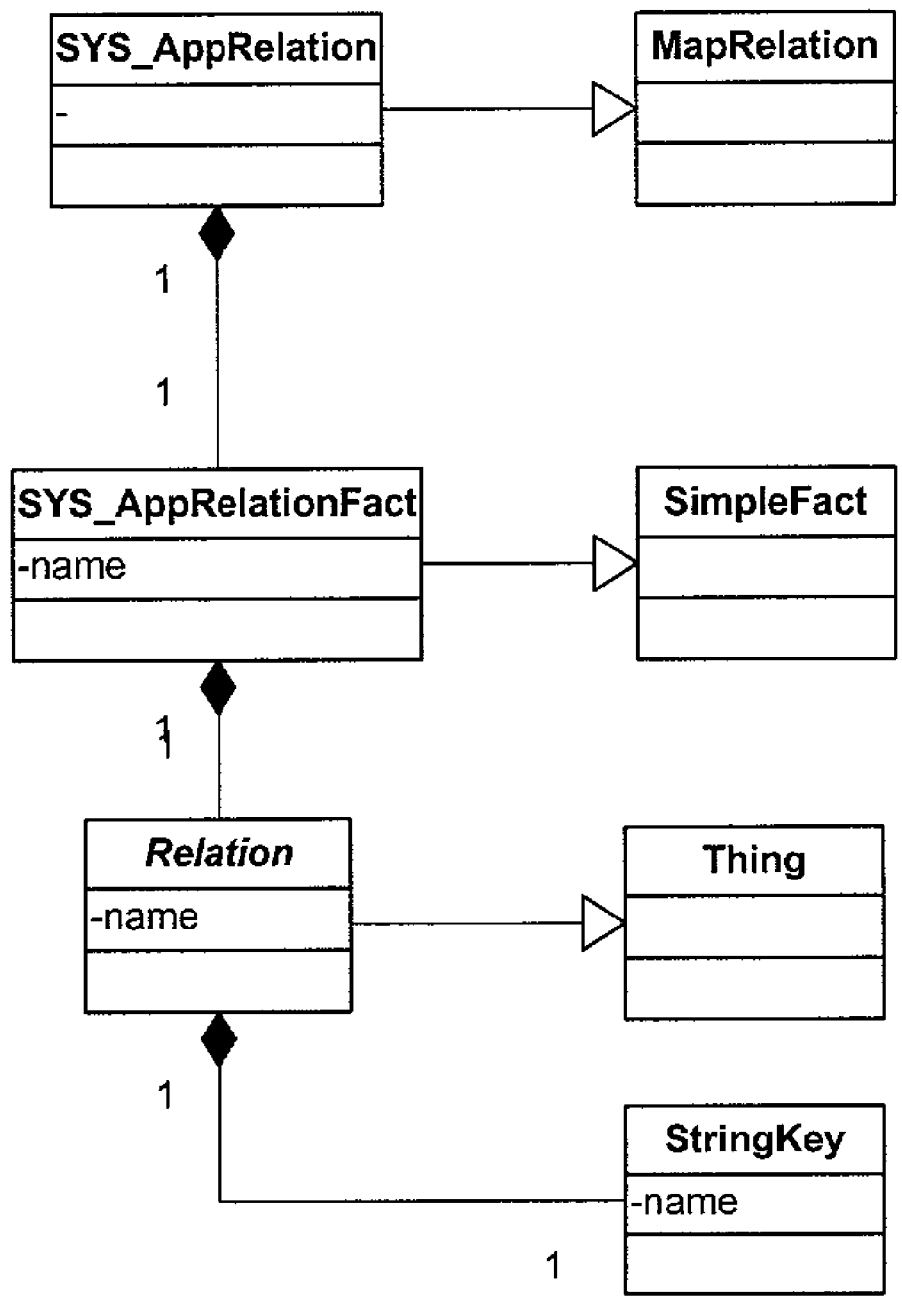
FIG. 15 depicts a UML representation of SYS_AppRelation, according to an embodiment of the invention.
Figure 16:
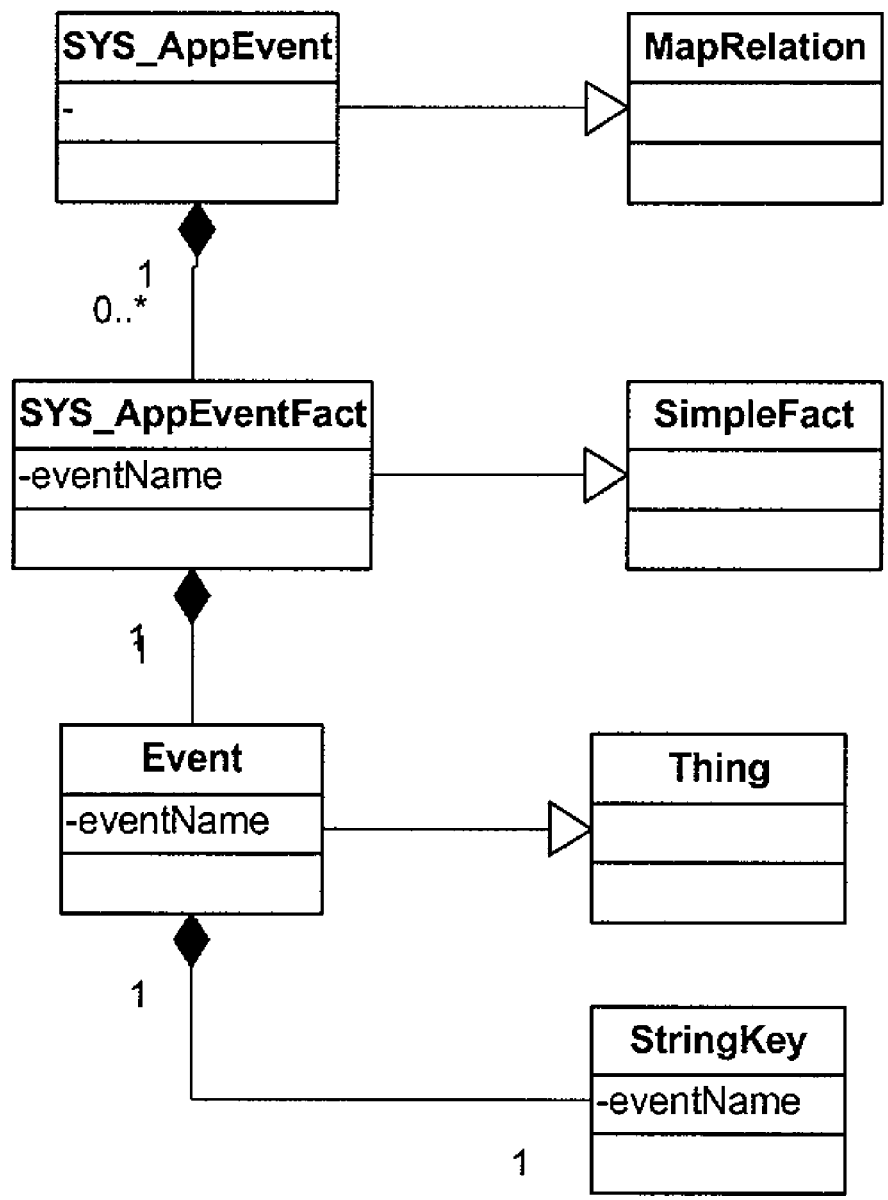
FIG. 16 depicts a UML representation of SYS_AppEvent, according to an embodiment of the invention.

FIG. 15 depicts a UML representation of SYS_AppRelation, according to an embodiment of the invention. SYS_AppRelation is a relation that stores application scope relations FIG. 16 depicts a UML representation of SYS_AppEvent, according to an embodiment of the invention. SYS_AppEvent is a relation that stores application scope events.

Figure 17:
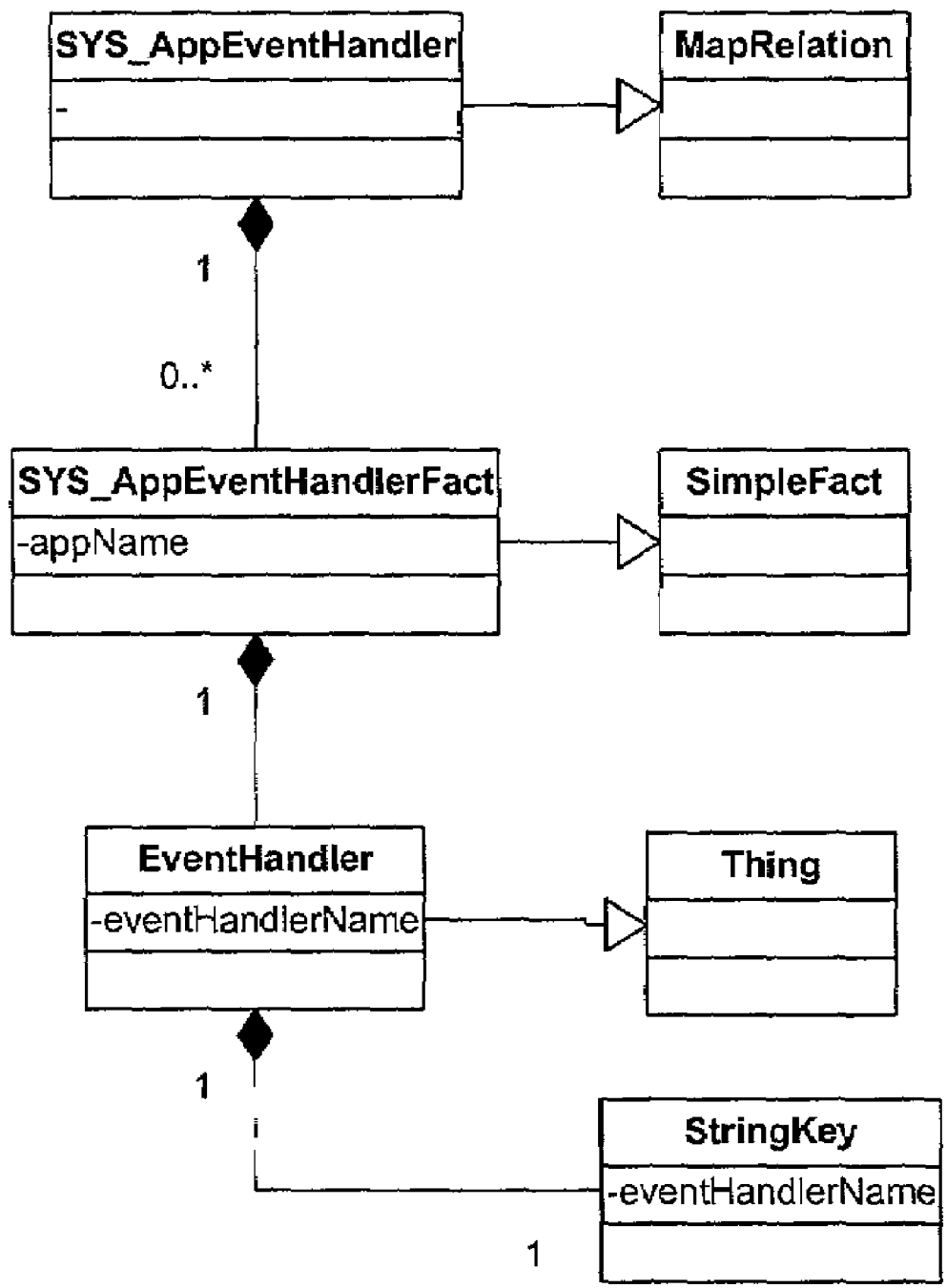
FIG. 17 depicts a UML representation of SYS_AppEventHandler, according to an embodiment of the invention.

FIG. 17 depicts a UML representation of SYS_AppEventHandler, according to an embodiment of the invention. SYS_AppEventHandler is a relation that stores application scope event handlers.

Figure 18:
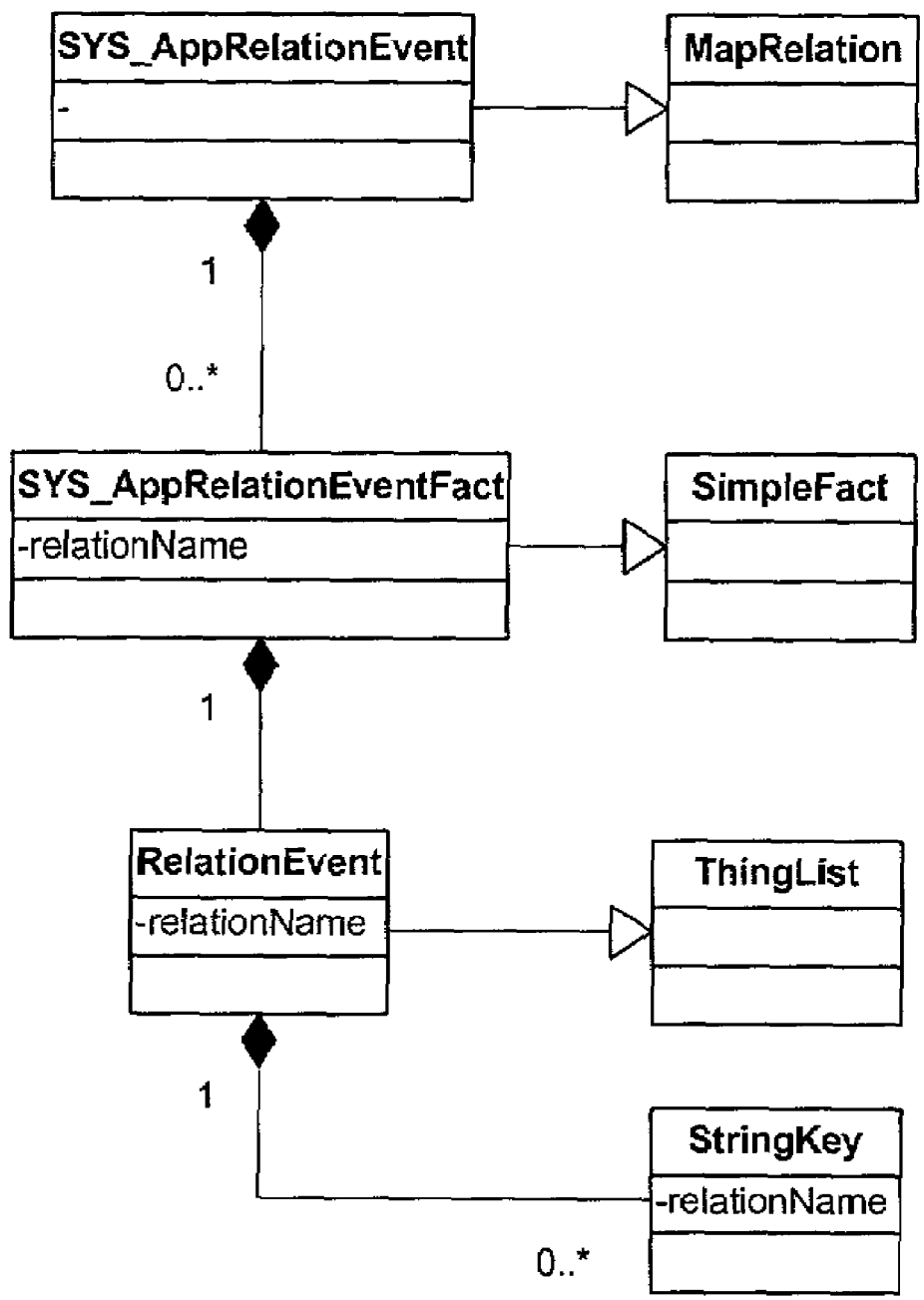
FIG. 18 depicts a UML representation of SYS_AppRelationEvent, according to an embodiment of the invention.

FIG. 18 depicts a UML representation of SYS_AppRelationEvent, according to an embodiment of the invention. SYS_AppRelationEvent is the relation of that stores the events of application scope relations.

Figure 19:
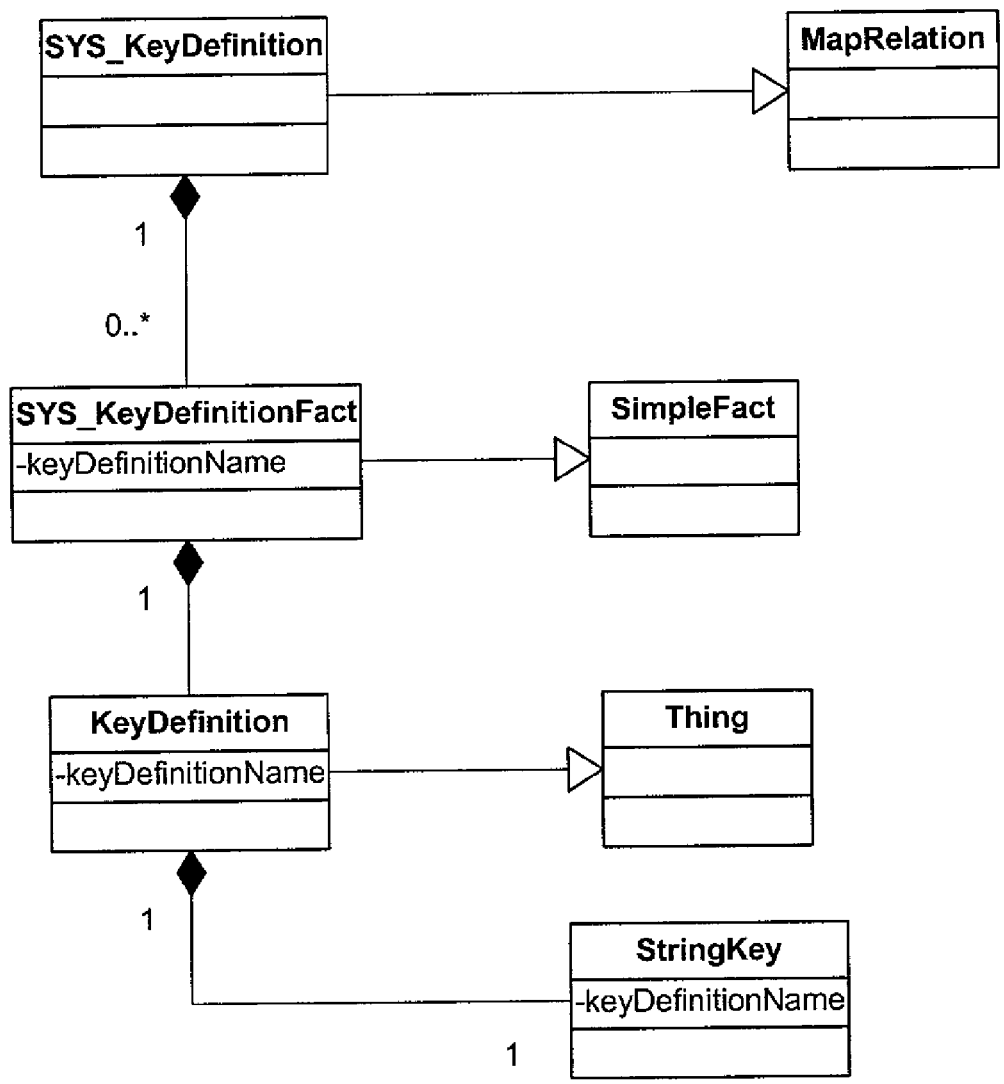
FIG. 19 depicts a UML representation of SYS_KeyDefinition, according to an embodiment of the invention.

FIG. 19 depicts a UML representation of SYS_KeyDefinition, according to an embodiment of the invention. SYS KeyDefinition is a relation that stores the definitions of application keys.

Figure 20:
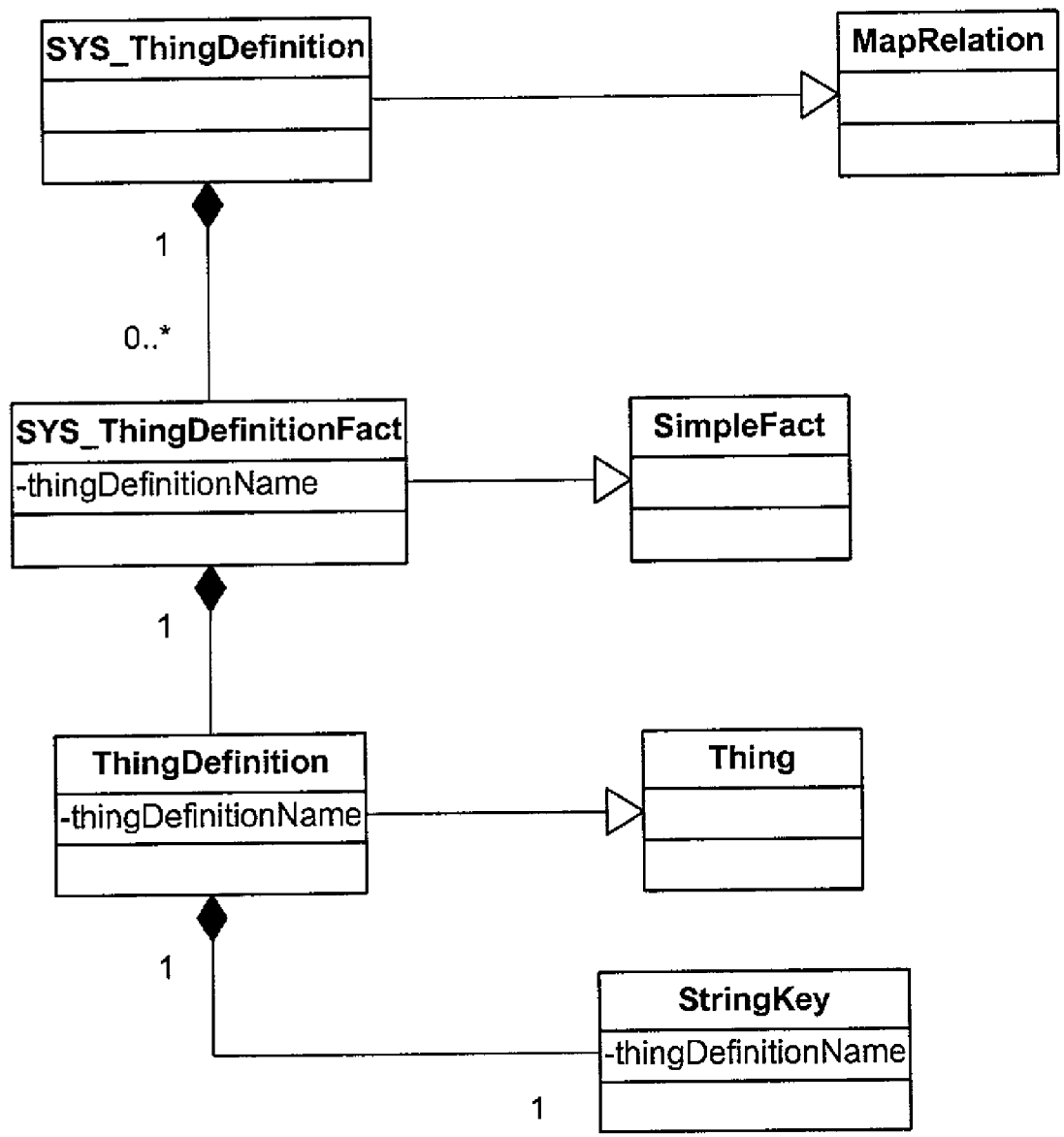
FIG. 20 depicts a UML representation of SYS_ThingDefinition, according to an embodiment of the invention.

FIG. 20 depicts a UML representation of SYS_ThingDefinition, according to an embodiment of the invention. SYS_ThingDefinition is a relation that stores the definitions of application things.

Figure 21:
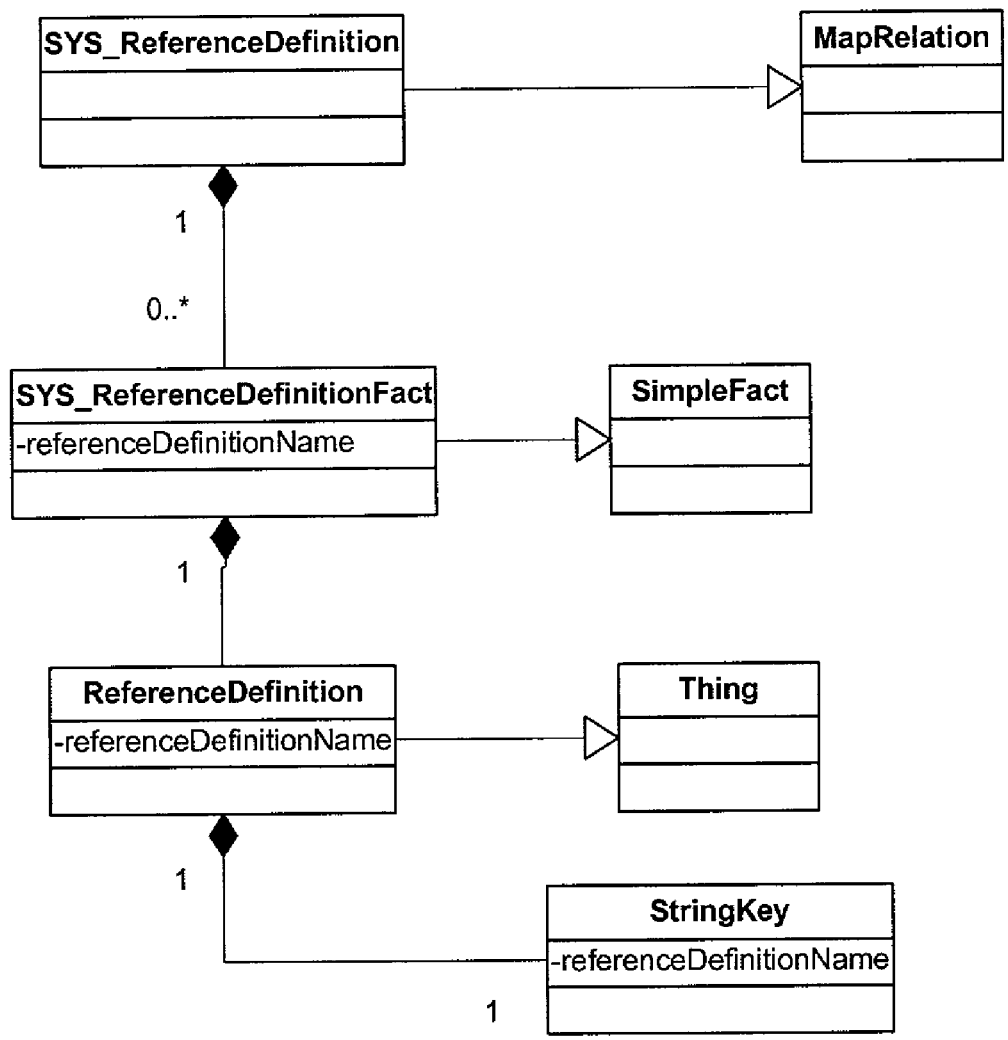
FIG. 21 depicts a UML representation of SYS_ReferenceDefinition, according to an embodiment of the invention.

FIG. 21 depicts a UML representation of SYS_ReferenceDefinition, according to an embodiment of the invention. SYS_ReferenceDefinition is a relation that stores the definitions of application references.

Figure 22:
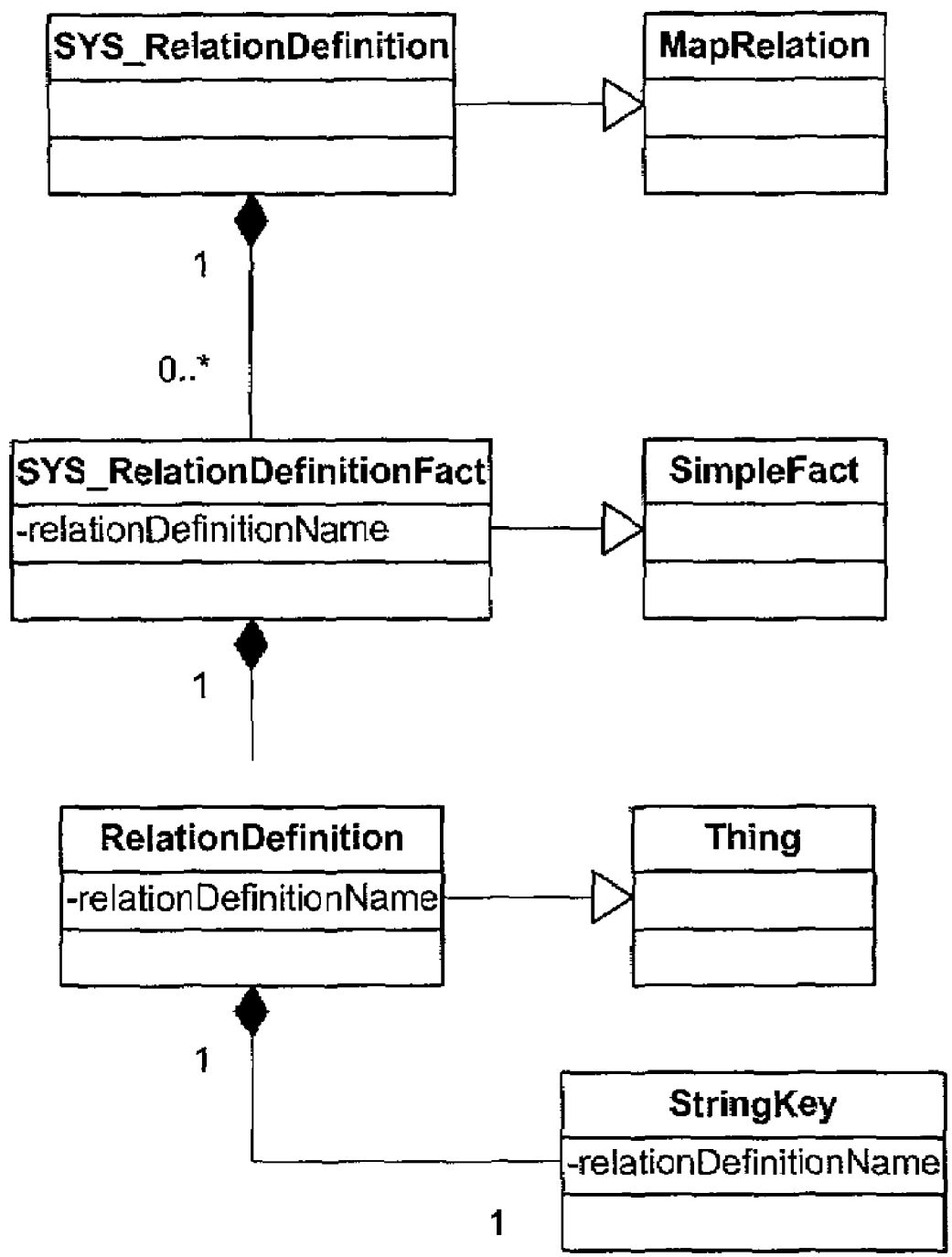
FIG. 22 depicts a UML representation of SYS_RelationDefinition, according to an embodiment of the invention.

FIG. 22 depicts a UML representation of SYS_RelationDefinition, according to an embodiment of the invention. SYS_RelationDefinition is a relation that stores the definitions of application relations.

Figure 23:
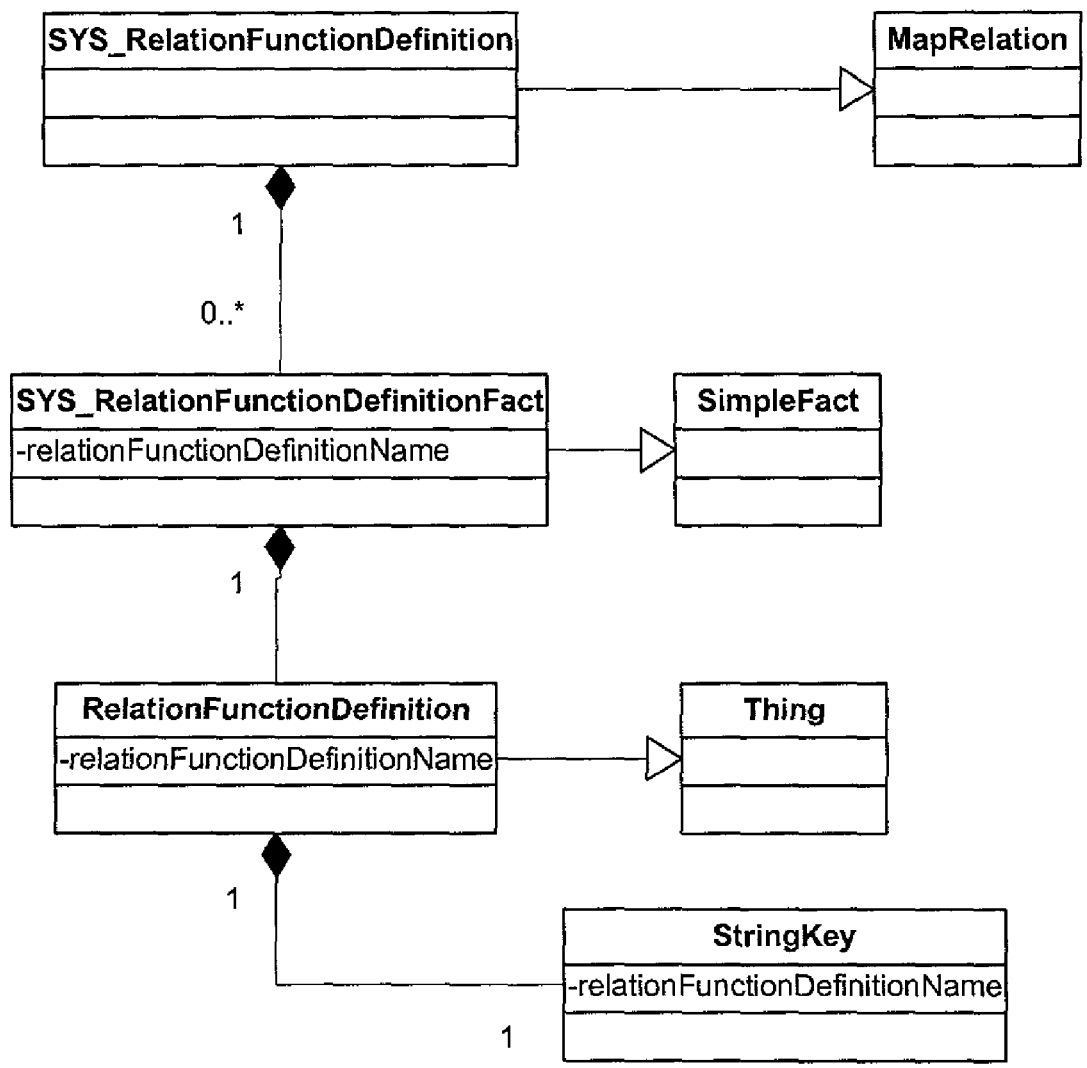
FIG. 23 depicts a UML representation of SYS_RelationFunctionDefinition, according to an embodiment of the invention.

FIG. 23 depicts a UML representation of SYS_RelationFunctionDefinition, according to an embodiment of the invention. SYS_RelationFunctionDefinition is a relation that stores the definitions of application relation functions.

Figure 24:
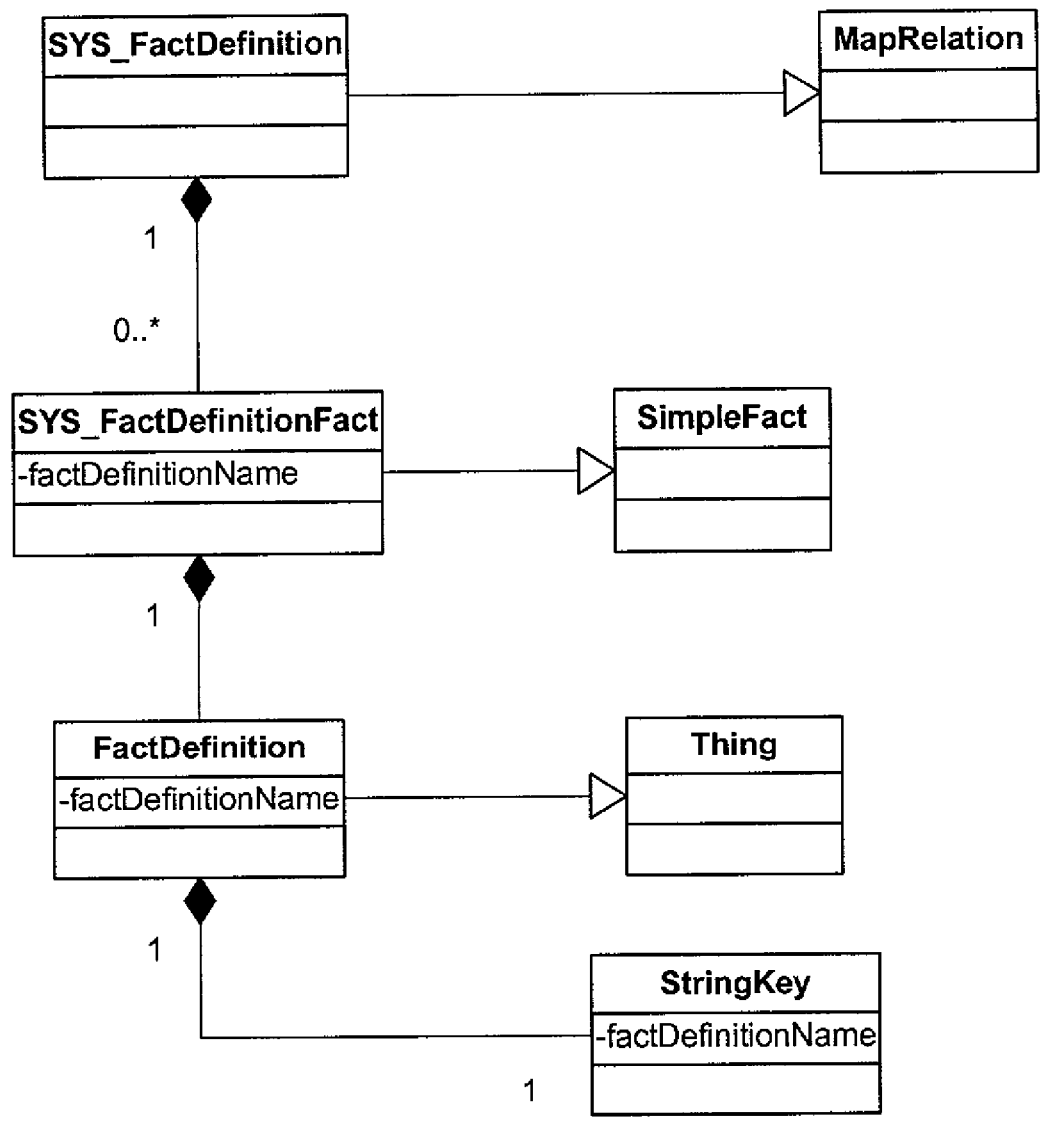
FIG. 24 depicts a UML representation of SYS_FactDefinition, according to an embodiment of the invention.

FIG. 24 depicts a UML representation of SYS_FactDefinition, according to an embodiment of the invention. SYS_FactDefinition is a relation that stores the definitions of application facts.

Figure 25:
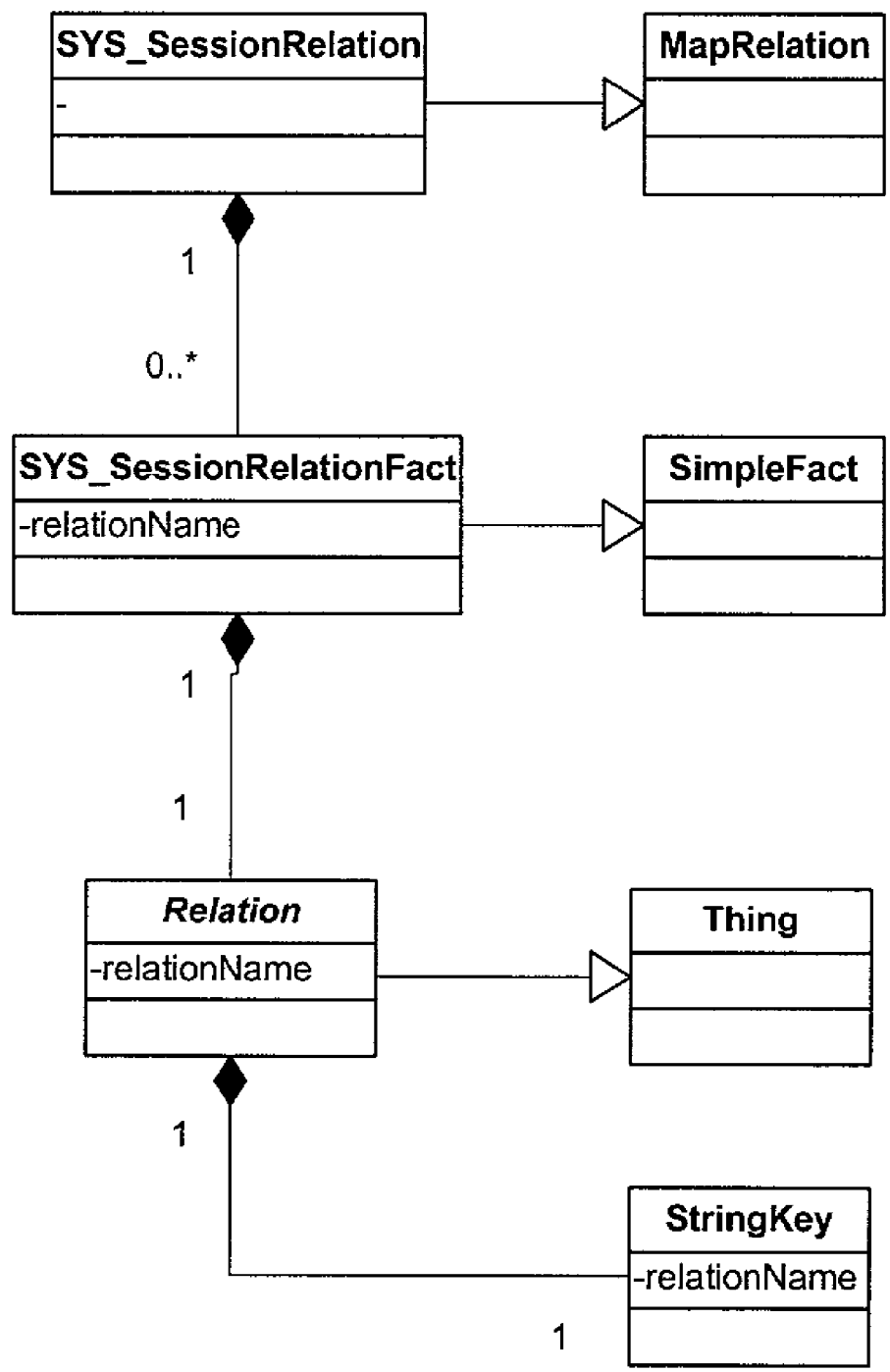
FIG. 25 depicts a UML representation of SYS_SessionRelation, according to an embodiment of the invention.

FIG. 25 depicts a UML representation of SYS_SessionRelation, according to an embodiment of the invention. SYS_SessionRelation is the root relation of all session scope relations.

Figure 26:
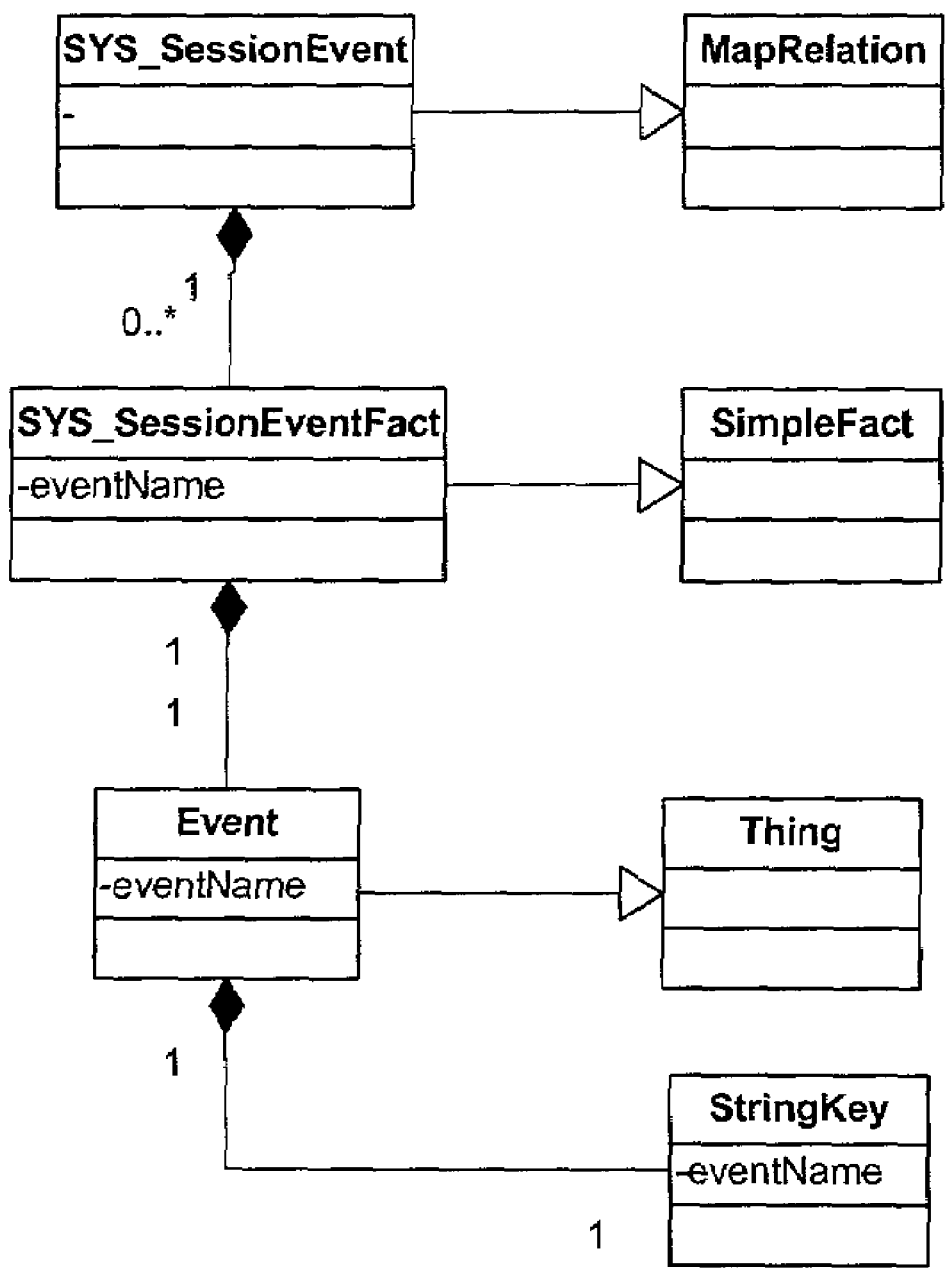
FIG. 26 depicts a UML representation of SYS_SessionEvent, according to an embodiment of the invention.

FIG. 26 depicts a UML representation of SYS_SessionEvent, according to an embodiment of the invention. SYS_SessionEvent is the root relation of all session scope events.

Figure 27:
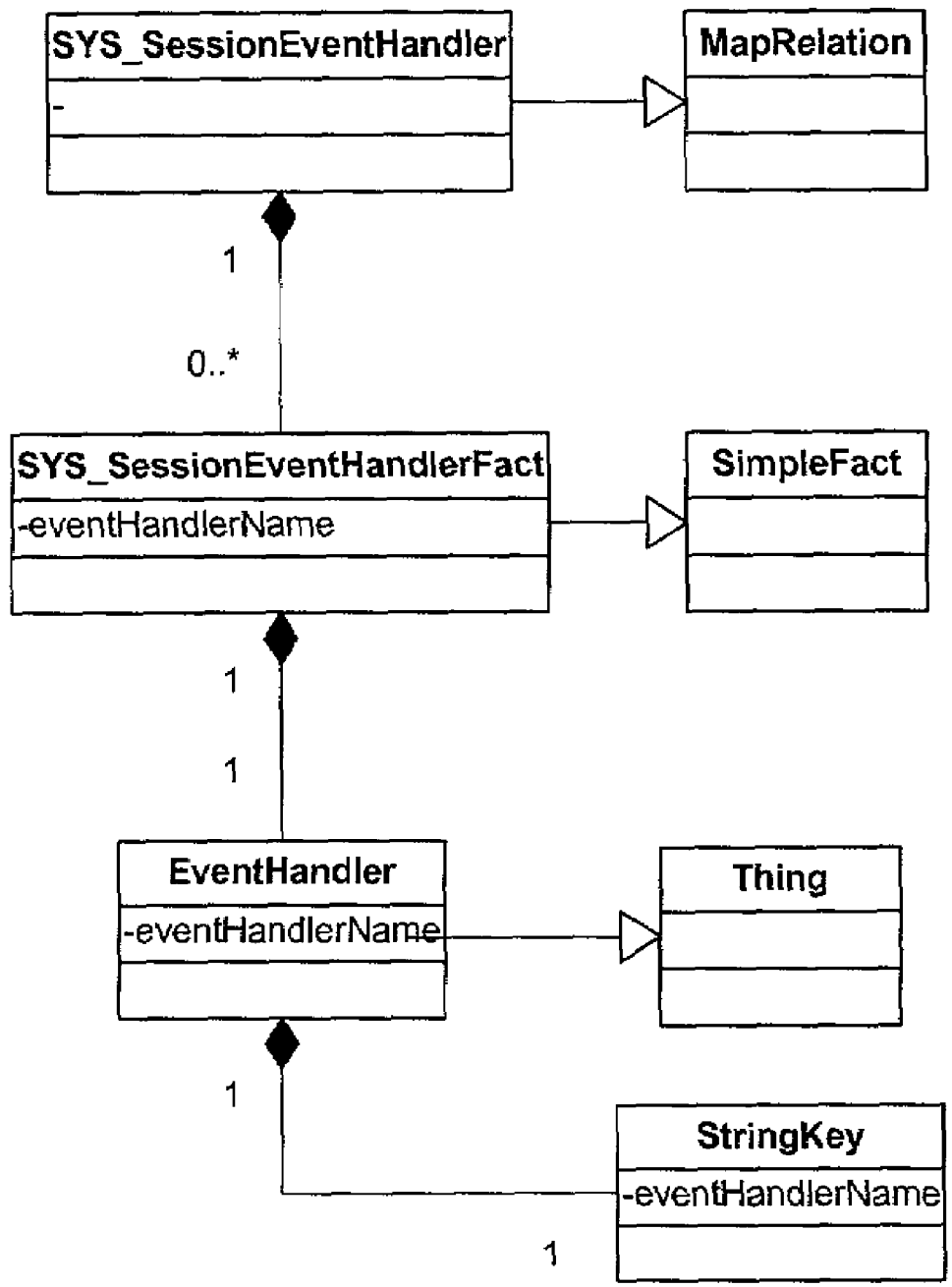
FIG. 27 depicts a UML representation of SYS_SessionEventHandler, according to an embodiment of the invention.

FIG. 27 depicts a UML representation of SYS_SessionEventHandler, according to an embodiment of the invention. SYS_SessionEventHandler is the root relation of all session scope event handlers.

Figure 28:
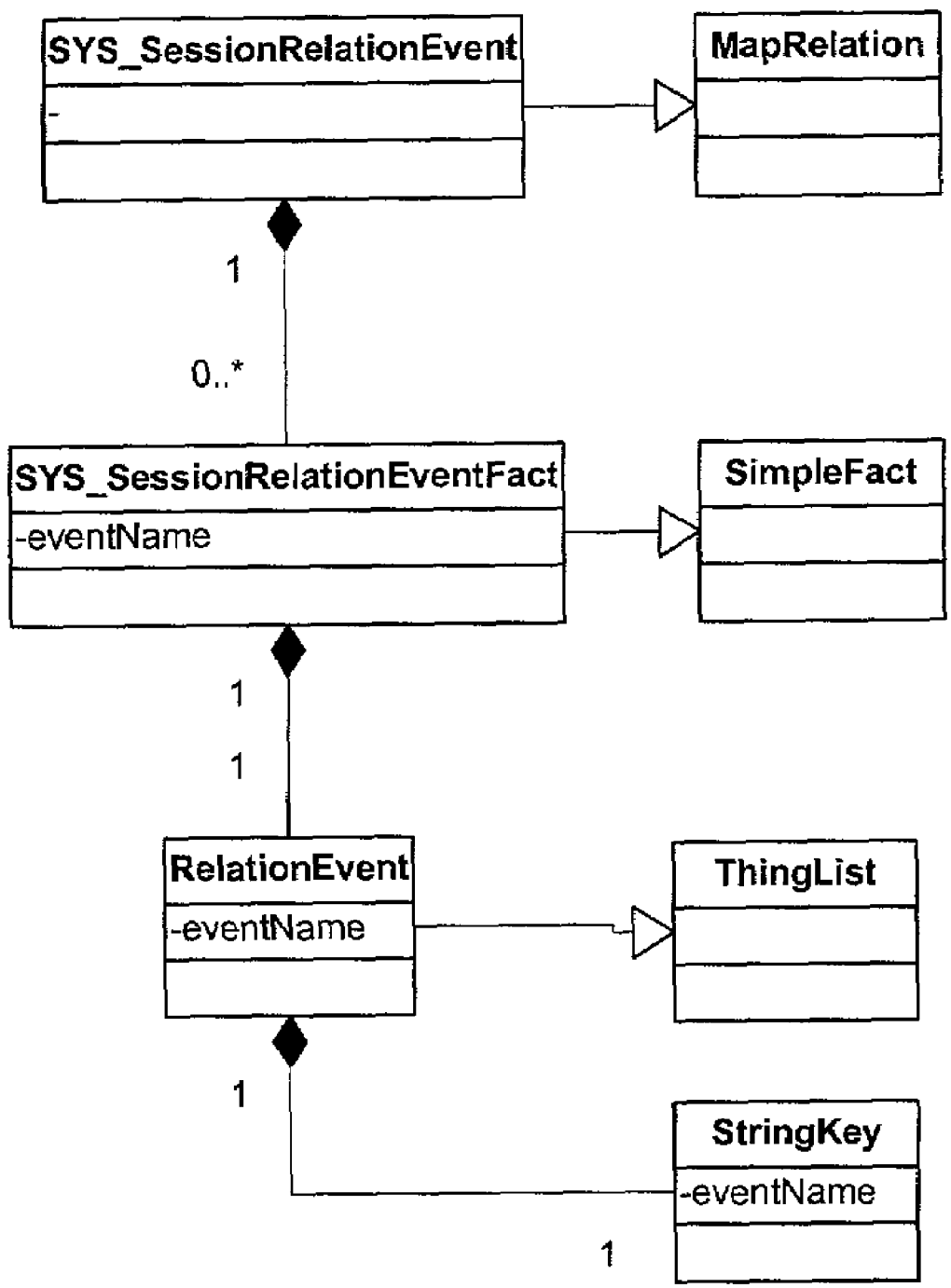
FIG. 28 depicts a UML representation of SYS_SessionRelationEvent, according to an embodiment of the invention.

FIG. 28 depicts a UML representation of SYS_SessionRelationEvent, according to an embodiment of the invention. SYS_SessionRelationEvent is the relation of that stores the events of a session relation.

What is claimed is:

1. A computer program stored on a computer readable medium for creating knowledge-oriented software application using an object-oriented programming language, the computer program comprising:
 a code segment for storing in a human readable format a set of logic details for the knowledge-oriented software application, wherein the set of logic details includes definable logic instructions;
 a code segment for deriving new relations from a set of base relations together with the set of logic details and imposing rules and constraints on the base relations, wherein the new relations comprise a set of relation functions including the set of logic details and providing code that accepts a predetermined number of base relations as input and returns derived knowledge for the knowledge-oriented software application to be generated as data representing the new relations;
 a code segment for storing a definition and a set of requirements for each of the relation functions in the knowledge-oriented software application thereby creating a logical design of the knowledge-oriented software application;
 a code segment for storing within an electronic device a set of user sessions for the knowledge-oriented software application, the logical design of the knowledge-oriented software application, and run time data for the knowledge-oriented software application; and
 a code segment for dynamically assembling a set of executable components at run time using the set of user sessions and the run time data in accordance with the logical design, wherein the set of executable components converts the set of logic details and the relation functions from human readable format into code that is executable by a computer;
  enabling concurrent clients to execute the knowledge-oriented software application to manipulate the knowledge stored in the electronic device.

2. The computer program of claim 1, wherein the code segment for storing in a human readable format a set of logic details further comprises a Thing, a Key, a Fact and a Knowledge Definition.

3. The computer program of claim 2, wherein the Thing comprises an object-oriented representation of a named object.

4. The computer program of claim 2, wherein the Key comprises an object-oriented representation of a name of the Thing.

5. The computer program of claim 2, wherein the Fact comprises an object-oriented representation of facts regarding a set of things.

6. The computer program of claim 1, wherein the relation functions further comprises object-oriented representations of sets of facts.

7. The computer program of claim 1, wherein the code segment for deriving new relations further comprises an Event and an Event Handler.

8. The computer program of claim 7, wherein the Event comprises an object-oriented representation of functions selected from a group consisting of: adding, editing, modifying, and dropping a Relation.

9. The computer program of claim 7, wherein the Event Handler comprises an object oriented representation of responses to the Event.

10. The computer program of claim 1, wherein the set of relation functions comprises object-oriented representations of actions.

11. The computer program of claim 1, wherein the set of relation functions comprises object-oriented representations of queries.

12. The computer program of claim 1, wherein the set of relation functions comprises object-oriented representations of functions.

13. A computerized system for creating a knowledge-oriented software application using an object-oriented programming language comprising:
 a processor; and
 a storage device comprising:
 a code segment for storing in a human readable format a set of logic details for the knowledge-oriented software application, and further comprising a Thing, a Key, a Fact and a Knowledge Definition, wherein the Thing comprises an abstract base Thing class with a method for retrieving a Key of a Thing instance, further wherein the Key comprises a unique identifier, wherein the set of logic details includes definable logic instructions;
 code segment for deriving new relations from a set of base relations together with the set of logic details and imposing rules and constraints on the base relations, wherein the new relations comprise a set of relation functions including the set of logic details and providing code that accepts a predetermined number of base relations as input and returns derived knowledge for the knowledge-oriented software application to be generated as data representing the new relations;
 code segment for storing a definition and a set of requirements for each of the relation functions in the knowledge-oriented software application thereby creating a logical design of the knowledge-oriented software application;
 a code segment for storing a set of user sessions for the knowledge-oriented software application, the logical design of the knowledge-oriented software application, and run time data for the knowledge-oriented software application within an electronic device; and
 a code segment for dynamically assembling a set of executable components at run time using the set of user sessions and the run time data in accordance with the logical design, wherein the set of executable components converts the set of logic details and the relation functions from human readable format into code that is executable by a computer;
  enabling concurrent clients to execute the knowledge-oriented software application to manipulate the knowledge stored in the storage device.

14. The computerized system of claim 13, wherein the Thing comprises a static Thing Definition object that defines its physical implementation.

15. The computerized system of claim 14, wherein the Thing is extendible to create application-specific Thing classes and wherein the Thing class is a base class for all domain-specific object classes.

16. The computerized system of claim 13, wherein the Key comprises an abstract base type and a StringKey, a DateKey and a IntegerKey are sub types of the Key.

17. The computerized system of claim 16, wherein the StringKey creates the Key from a string and wherein the StringKey comprises a method to get a string value of a string key.

18. The computerized system of claim 16, wherein the IntegerKey creates the Key from an integer and wherein the IntegerKey comprises a method to get an integer value of an integer key.

19. The computerized system of claim 16, wherein the DateKey creates the Key from a date and wherein the DateKey comprises a method to get a date value of a date key, and wherein the Key is extendible to create other types of keys.

20. The computerized system of claim 13, where the Fact is a sub type of the Thing.

21. The computerized system of claim 13, wherein the Fact is as an abstract base type.

22. The computerized system of claim 13, wherein the Fact is a set of the Things, and wherein the Things can be gotten and updated by their ordinal numbers.

23. The computerized system of claim 13, wherein the Fact is a set of the Things, and wherein the Things can be gotten and updated by their names.

24. The computerized system of claim 13, wherein an implementation of the Fact has a fixed cardinality.

25. The computerized system of claim 13, wherein the Fact has a Type and methods to get and set the Fact Type, wherein the Fact Type can be Simple, OneToOne, and ManyToOne.

26. The computerized system of claim 22, wherein the Things of the Fact can be gotten and set as an array of the Things.

27. The computer program of claim 1, wherein the code segment for storing a set of user sessions for the knowledge-oriented application further comprises storing a declarative definition of an Application and the Application's run-time data.

28. The computer program of claim 27, wherein the code segment for storing a set of user sessions for the knowledge-oriented application further comprises a set of classes that are subclasses of the Thing, Key, relation functions, Fact, and Knowledge Definition.

29. The computer program of claim 1, wherein the code segment for dynamically assembling the set of executable components at run time further comprises a Session, a Kernel, and subtypes of an Application.

30. The computer program of claim 29, wherein the Application comprises an object oriented definition of how the Application can be accessed by a computer program that uses the services of the Application.

31. The computer program of claim 29, wherein the Session comprises an object oriented definition of how the Application can be accessed by concurrent users.

32. The computerized system of claim 13, wherein the Thing comprises an object-oriented representation of a named object.

33. The computerized system of claim 13, wherein the Key comprises an object-oriented representation of a name of the Thing.

34. The computerized system of claim 13, wherein the Fact comprises an object-oriented representation of facts regarding a set of things.

35. The computerized system of claim 13, wherein the relation functions further comprises object-oriented representations of sets of facts.

36. The computerized system of claim 13, wherein the code segment for dynamically assembling a set of executable components at run time further comprises a Session, a Kernel, and subtypes of an Application.

37. The computerized system of claim 36, wherein the Application comprises an object oriented definition of how the Application can be accessed by a computer program that uses the services of the Application.

38. The computerized system of claim 36, wherein the Session comprises an object oriented definition of how the Application can be accessed by concurrent users.

* * * * *